(12) United States Patent
Tan et al.

(10) Patent No.:  US 12,572,283 B2
(45) Date of Patent:  Mar. 10, 2026

(54) WRITE BUFFER CONTROL IN MANAGED MEMORY SYSTEM

(71) Applicant: Micron Technology, Inc., Boise, ID (US)

(72) Inventors: Hua Tan, Shanghai (CN); Hui Yang, Shanghai (CN); Mauro Luigi Sali, Sant'Angelo Lodigiano (IT)

(73) Assignee: Micron Technology, Inc., Boise, ID (US)

( * ) Notice: Subject to any disclaimer, the term of this patent is extended or adjusted under 35 U.S.C. 154(b) by 627 days.

(21) Appl. No.: 16/968,371

(22) PCT Filed: Aug. 27, 2019

(86) PCT No.: PCT/CN2019/102902
§ 371 (c)(1),
(2) Date: Aug. 7, 2020

(87) PCT Pub. No.: WO2021/035551
PCT Pub. Date: Mar. 4, 2021

(65) Prior Publication Data
US 2023/0143181 A1  May 11, 2023

(51) Int. Cl.
*G06F 3/06* (2006.01)
*G06F 12/02* (2006.01)
*G06F 12/0815* (2016.01)

(52) U.S. Cl.
CPC .......... *G06F 3/0619* (2013.01); *G06F 3/0656* (2013.01); *G06F 3/0679* (2013.01); (Continued)

(58) Field of Classification Search
CPC .... G06F 3/0619; G06F 3/0656; G06F 3/0679; G06F 12/0253; G06F 12/0815; (Continued)

(56) References Cited

U.S. PATENT DOCUMENTS 6,226,715 B1 * 5/2001 Van Der Wolf ...... G06F 12/121
711/E12.07
7,475,321 B2 * 1/2009 Gurumurthi ........ G06F 11/0724
711/155
(Continued)

FOREIGN PATENT DOCUMENTS

CN 103688246 3/2014
CN 105786403 7/2016
(Continued)

OTHER PUBLICATIONS

P. Weisberg et al., "Using 4KB p. Size for Virtual Memory is Obsolete", IEEE IRI, Jul. 2009, pp. 262-265, https://ieeexplore. IEEE.org/stamp/stamp.jsp?tp=&arnumber=5211562&tag=1 (Year: 2009).*

(Continued)

*Primary Examiner* — Christopher D Birkhimer
(74) *Attorney, Agent, or Firm* — Schwegman Lundberg & Woessner, P.A.

(57) ABSTRACT

Upon receipt of a synchronize cache command, valid host data size in the SRAM write buffer is checked. If the valid data size is greater than a predetermined value, valid host data in the SRAM write buffer is flushed directly into an open MLC block based on a one-pass transfer program. However, if the valid host data size is less than the predetermined value, the host data is not flushed to an open MLC block but is instead flushed into a temporary storage location to satisfy the command specifications for a command to synchronize a cache. The host data is maintained in the SRAM write buffer, which receives additional data until full. Once full, the host data in the SRAM write buffer is transferred to an open MLC block in one-pass. If the host data in the write buffer is lost, it may be recovered from the temporary storage location.

14 Claims, 8 Drawing Sheets

(52) U.S. Cl.
CPC ...... *G06F 12/0253* (2013.01); *G06F 12/0815*
(2013.01); *G06F 2212/1016* (2013.01)

(58) Field of Classification Search
CPC ..... G06F 2212/1016; G06F 2212/7203; G06F
2212/7208; G06F 12/0246
See application file for complete search history.

(56) References Cited

U.S. PATENT DOCUMENTS

| | | | | | |
|---|---|---|---|---|---|
| 8,364,898 | B2 * | 1/2013 | Balakrishnan | ...... | G06F 12/0802 |
| | | | | | 711/134 |
| 8,370,850 | B2 * | 2/2013 | Nochimowski | ....... | G06F 3/0679 |
| | | | | | 711/123 |
| 8,732,409 | B2 * | 5/2014 | Van Der Wolf | .... | G06F 12/0804 |
| | | | | | 711/143 |
| 9,043,556 | B2 * | 5/2015 | Balakrishnan | ...... | G06F 12/0808 |
| | | | | | 711/133 |
| 9,892,803 | B2 * | 2/2018 | Reed | .................. | G06F 12/0811 |
| 10,019,362 | B1 * | 7/2018 | Chatterjee | ........... | G06F 12/0893 |
| 2001/0047454 | A1 * | 11/2001 | Soderstrom | .......... | G06F 3/0632 |
| | | | | | 711/118 |
| 2004/0039880 | A1 * | 2/2004 | Pentkovski | ......... | G06F 12/0811 |
| | | | | | 711/146 |
| 2004/0103251 | A1 * | 5/2004 | Alsup | ................. | G06F 12/0897 |
| | | | | | 711/E12.043 |
| 2006/0143406 | A1 * | 6/2006 | Chrysos | .............. | G06F 12/0811 |
| | | | | | 711/143 |
| 2006/0156155 | A1 * | 7/2006 | Gurumurthi | ........ | G06F 11/0724 |
| | | | | | 714/746 |
| 2007/0283081 | A1 * | 12/2007 | Lasser | ................. | G06F 12/0246 |
| | | | | | 711/E12.04 |
| 2008/0098164 | A1 | 4/2008 | Lee et al. | | |
| 2008/0209112 | A1 * | 8/2008 | Yu | ....................... | G06F 12/0246 |
| | | | | | 711/E12.001 |
| 2010/0070711 | A1 * | 3/2010 | Arimilli | .............. | G06F 12/0831 |
| | | | | | 711/146 |
| 2010/0281216 | A1 * | 11/2010 | Patel | .................... | G06F 12/121 |
| | | | | | 711/E12.017 |
| 2013/0232296 | A1 | 9/2013 | Yonezawa et al. | | |
| 2014/0140142 | A1 | 5/2014 | Ko et al. | | |
| 2014/0156909 | A1 * | 6/2014 | Farhan | ................ | G06F 12/0871 |
| | | | | | 711/103 |

| | | | | | |
|---|---|---|---|---|---|
| 2014/0198570 | A1 * | 7/2014 | Hsieh | ................. | G11C 16/3459 |
| | | | | | 365/185.03 |
| 2014/0237147 | A1 * | 8/2014 | Joshi | .................... | G06F 3/0664 |
| | | | | | 710/74 |
| 2014/0359221 | A1 * | 12/2014 | Kalamatianos | ..... | G06F 12/0862 |
| | | | | | 711/122 |
| 2014/0379961 | A1 * | 12/2014 | Lasser | ................. | G06F 12/0246 |
| | | | | | 711/103 |
| 2016/0225459 | A1 | 8/2016 | Boysan et al. | | |
| 2017/0075811 | A1 * | 3/2017 | Hsu | ...................... | G06F 3/0604 |
| 2017/0109096 | A1 * | 4/2017 | Jean | ..................... | G06F 3/0679 |
| 2017/0329539 | A1 * | 11/2017 | Ko | ....................... | G06F 12/0246 |
| 2017/0364262 | A1 * | 12/2017 | Roberts | ................. | G06F 3/061 |
| 2017/0371548 | A1 * | 12/2017 | Um | ..................... | G06F 12/0246 |
| 2018/0059966 | A1 * | 3/2018 | Lee | ........................ | G06F 13/28 |
| 2019/0042146 | A1 * | 2/2019 | Wysoczanski | ...... | G06F 12/0246 |
| 2019/0043540 | A1 * | 2/2019 | Chagam Reddy | .. | G06F 12/0246 |
| 2019/0227708 | A1 * | 7/2019 | Hsieh | .................... | G06F 3/0679 |
| 2019/0227884 | A1 * | 7/2019 | Li | ........................ | G06F 11/1471 |
| 2019/0235785 | A1 * | 8/2019 | Akers | ................... | G06F 3/0659 |
| 2019/0235789 | A1 * | 8/2019 | Yan | ......................... | G06F 3/064 |
| 2019/0303041 | A1 * | 10/2019 | Kim | ................... | G06F 13/1689 |
| 2023/0147213 | A1 * | 5/2023 | Cao | ....................... | G06F 3/0679 |
| | | | | | 711/103 |

FOREIGN PATENT DOCUMENTS

| | | | | |
|---|---|---|---|---|
| CN | 109977111 | | 7/2019 | |
| DE | 102014225253 A1 * | 6/2015 | ............. | G06F 13/14 |
| DE | 102016007365 A1 * | 12/2016 | ............. | G06F 11/00 |
| TW | 201421477 | | 6/2014 | |

OTHER PUBLICATIONS

Microsoft, "Computer Dictionary", Fifth Edition, 2002, p. 220 (Year: 2002).*

Microsoft, "Computer Dictionary", Fifth Edition, 2002, p. 515 (Year: 2002).*

"International Application Serial No. PCT CN2019 102902, International Search Report mailed May 27, 2020", 4 pgs.

"International Application Serial No. PCT CN2019 102902, Written Opinion mailed May 27, 2020", 4 pgs.

"Chinese Application Serial No. 201980100281.9, Office Action mailed Dec. 3, 2025", with English translation, 15 pages.

\* cited by examiner

WRITE BUFFER CONTROL IN MANAGED MEMORY SYSTEM

PRIORITY APPLICATION

This application is a U.S. National Stage Application under 35 U.S.C. 371 from International Application No. PCT/CN2019/102902, filed 27 Aug. 2019, which is incorporated herein by reference in its entirety.

TECHNICAL FIELD

Embodiments described herein generally relate to systems and methods for implementing a command in a managed memory system to flush data from a write buffer to the storage array in a manner to limit write amplification which may otherwise result from such transfers.

BACKGROUND

Memory devices are typically provided as internal, semiconductor, integrated circuits in computers or other electronic devices. There are many different types of memory, including volatile and non-volatile memory. Volatile memory requires power to maintain its data, and includes random-access memory (RAM), in various forms, such as dynamic random-access memory (DRAM), or synchronous dynamic random-access memory (SDRAM), among others. Non-volatile memory may retain stored data when not powered (may be implemented as read-only memory (ROM) in some cases), and may include one or more storage technologies, such as flash memory (e.g., NAND or NOR flash), electrically erasable programmable ROM (EEPROM), static RAM (SRAM), Ferroelectric RAM (FeRAM), erasable programmable ROM (EPROM), resistance variable memory, such as phase-change random-access memory (PCRAM), resistive random-access memory (RRAM), magnetoresistive random-access memory (MRAM), or 3D XPoint™ memory, among others.

Memory arrays or devices may be combined together to form a storage volume of a memory system, such as a solid-state drive (SSD), a Universal Flash Storage (UFS™) device, a MultiMediaCard (MMC) solid-state storage device, an embedded MMC device (eMMC™), and the like. An SSD may be used as, among other things, the main storage device of a computer, having advantages over traditional hard drives with moving parts with respect to, for example, performance, size, weight, ruggedness, operating temperature range, and power consumption. For example, SSDs may have reduced seek time, latency, or other delay associated with magnetic disk drives (e.g., electromechanical, etc.). SSDs use non-volatile memory cells, such as flash memory cells to obviate internal battery supply requirements, thus allowing the drive to be more versatile and compact.

An SSD may include a number of memory devices, including a number of dies or logical units (e.g., logical unit numbers or LUNs), and may include one or more processors or other controllers performing logic functions that operate the memory devices or interface with external systems. Such SSDs may include one or more flash memory die, including a number of memory arrays (memory devices) and peripheral circuitry thereon. The flash memory arrays may include a number of blocks of memory cells organized into a number of physical pages. In some examples, the SSDs may also include DRAM or SRAM (or other forms of memory die or other memory structures). An SSD may receive commands from a host in association with memory operations, such as read or write operations to transfer data (e.g., user data and associated integrity data, such as error data and address data, etc.) between the memory devices and the host, or erase operations to erase data from the memory devices.

A flash storage such as an SSD may only be written for a limited number of times. At the end of an SSD's usage life, data may be corrupted, or the device may be rendered unusable if measures are not proactively taken to manage the SSD's lifespan. In an SSD consisting of NAND flash memory cells, electrons are trapped to the memory cell each time when data is written (e.g., via a programming operation), and electrons are taken off when data is removed (e.g., via an erasure operation). Electrons going in and out through the tunnel oxide during a program/erase (P/E) cycle may wear out the tunnel oxide, and thus reduce the SSD's lifetime.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
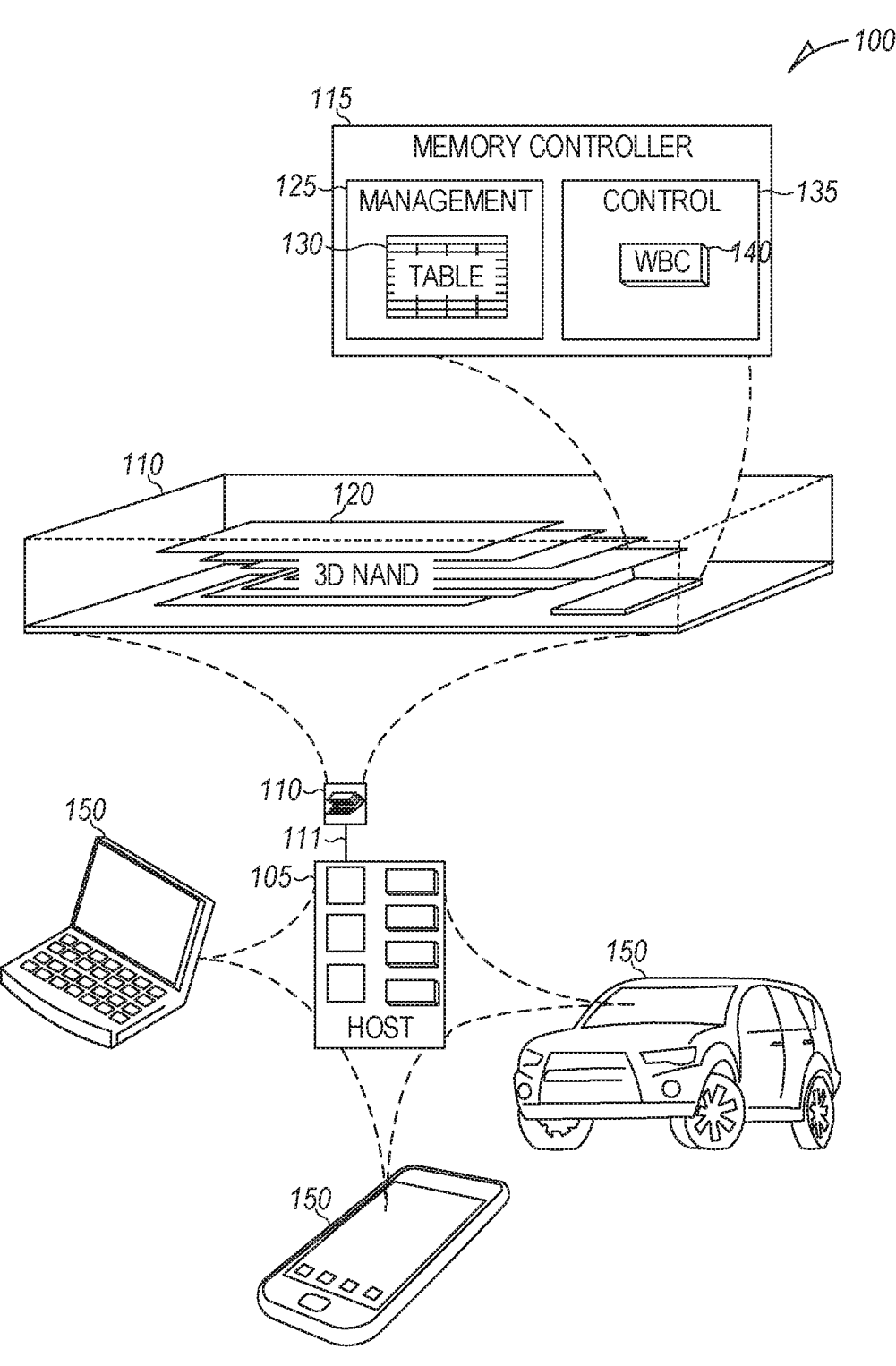
FIG. 1 illustrates a conceptualized diagram of an example of an environment including a memory device.

A synchronize cache command is a major Universal Flash Storage (UFS) command in the daily mobile usage model. Cache synchronization is also implemented in other memory systems. According to the UFS datasheet (JESD220C), a device flushes its SRAM buffer (cache) data into a storage medium (e.g., NAND flash) when receiving the synchronize cache command from its host. How the synchronize cache command is implemented significantly impacts the UFS device's reliability in the form of total bytes written (TBW) as well as the latency because different methods of implementing the synchronize cache command transfer different amounts of dummy data that impact TBW and require different latencies due to the different times for a one-pass triple-level cell (TLC) programming. Techniques are described herein for implementing cache synchronization by adding a temporary single-level cell (SLC) block to synchronize the cache to maximize memory transfer efficiency. In some examples, the systems and methods temporarily write data to an SLC block under conditions to more efficiently manage memory transfers that may result from write buffer flushes. Such techniques will be described below in the context of a NAND memory system, which will first be described in detail. It will be appreciated that the techniques described herein may be used for different types of memory systems that utilize cache synchronization such as the above example of a "synchronize cache" command or equivalents thereof.

Memory devices include individual memory die, which may, for example, include a storage region comprising one or more arrays of memory cells and implementing one (or more) selected storage technologies. Such a memory die will often include support circuitry for operating the memory array(s). Other examples, sometimes known generally as "managed memory devices," include assemblies of one or more memory die associated with controller functionality configured to control operation of the one or more memory die. Such controller functionality can simplify interoperability with an external device, such as a "host" as discussed later herein. In such managed memory devices, the controller functionality may be implemented on one or more die also incorporating a memory array or on a separate die. In other memory systems, one or more memory devices may be combined with controller functionality to form a solid-state drive (SSD) storage volume.

Example embodiments of the present disclosure are described in the example of managed memory devices implementing NAND flash memory cells, termed "managed NAND" devices. These examples, however, are not limiting on the scope of the disclosure, which may be implemented with memory devices implementing other memory storage technologies, such as the non-limiting examples previously discussed herein.

Both NOR and NAND flash architecture semiconductor memory arrays are accessed through decoders that activate specific memory cells by selecting the word line coupled to their gates. In a NOR architecture semiconductor memory array, once activated, the selected memory cells place their data values on bit lines, causing different currents to flow depending on the state at which a particular cell is programmed. In a NAND architecture semiconductor memory array, a high bias voltage is applied to a drain-side select gate (SGD) line. Word lines coupled to the gates of the unselected memory cells of each group are driven at a specified pass voltage (e.g., Vpass) to operate the unselected memory cells of each group as pass transistors (e.g., to pass current in a manner unrestricted by their stored data values). Current then flows from the source line to the bit line through each series coupled group, restricted only by the selected memory cells of each group, placing current encoded data values of selected memory cells on the bit lines.

Each flash memory cell in a NOR or NAND architecture semiconductor memory array can be programmed individually or collectively to one or a number of programmed states. For example, an SLC can represent one of two programmed states (e.g., 1 or 0), representing one bit of data. Flash memory cells can also represent more than two programmed states, allowing the manufacture of higher density memories without increasing the number of memory cells, as each cell can represent more than one binary digit (e.g., more than one bit). Such cells can be referred to as multi-state memory cells, multi-digit cells, or multi-level cells (MLCs). In certain examples MLC can refer to a memory cell that can store two bits of data per cell (e.g., one of four programmed states), a TLC can refer to a memory cell that can store three bits of data per cell (e.g., one of eight programmed states), and a quad-level cell (QLC) can store four bits of data per cell. MLC is used herein in its broader context, to refer to any memory cell(s) that can store more than one bit of data per cell (i.e., that can represent more than two programmed states).

Managed memory devices may be configured and operated in accordance with recognized industry standards. For example, managed NAND devices may be (as non-limiting examples), a UFS™ device, or an embedded MMC device (eMMC™), and so forth. For example, in the case of the above examples, UFS devices may be configured in accordance with Joint Electron Device Engineering Council (JEDEC) standards (e.g., JEDEC standard JESD223D, entitled "JEDEC UFS Flash Storage 3.0," and/or updates or subsequent versions to such standard. Similarly, identified eMMC devices may be configured in accordance with JEDEC standard JESD84-A51, entitled "JEDEC eMMC standard 5.1." and/or updates or subsequent versions to such standard. The identified standards are provided only as example environments in which the described methods and structures may be utilized; but such methods and structures may be utilized in a variety of environments outside of the identified standards (or of any other actual or proposed standards), except as expressly indicated herein.

An SSD can be used as, among other things, the main storage device of a computer, having advantages over traditional hard drives with moving parts with respect to, for example, performance, size, weight, ruggedness, operating temperature range, and power consumption. For example, SSDs can have reduced seek time, latency, or other delay associated with magnetic disk drives (e.g., electromechanical, etc.). SSDs use non-volatile memory cells, such as flash memory cells to obviate internal battery supply requirements, thus allowing the drive to be more versatile and compact. Memory devices include individual memory die, which may, for example, include a storage region comprising one or more arrays of memory cells, implementing one (or more) selected storage technologies. Such memory die will often include support circuitry for operating the memory array(s). Managed NAND devices can be used as primary or ancillary memory in various forms of electronic devices and are commonly used in mobile devices.

Both SSDs and managed memory devices can include a number of memory devices, including a number of dies or logical units (e.g., logical unit numbers or LUNs), and can include one or more processors or other controllers performing logic functions to operate the memory devices or interface with external systems. Such SSDs and managed memory devices can include one or more flash memory die, including a number of memory arrays and peripheral circuitry thereon. The flash memory arrays can include a number of blocks of memory cells organized into a number of physical pages. In some examples, the SSDs can also include DRAM or SRAM (or other forms of memory die or other memory structures). Similarly, managed NAND devices can include one or more arrays of volatile and/or nonvolatile memory separate from the NAND storage array, and either within or separate from a controller. Both SSDs and managed NAND devices can receive commands from a host in association with memory operations, such as read or write operations to transfer data (e.g., user data and associated integrity data, such as error data and address data, etc.) between the memory devices and the host, or erase operations to erase data from the memory devices.

The current embodiments will be described primarily in reference to managed NAND devices constructed and operated in accordance with the UFS standard. Though such managed NAND devices and the UFS standard represent only a pertinent example configuration, and the current methods and structures can be implemented with memory devices implementing other storage technologies and/or implementing other standards or operating protocols.

The P/E cycles may be used to quantify an endurance of a flash device such as an SSD. Endurance may be expressed as a drive writes per day (DWPD), which measures how many times a host may overwrite the drive's entire size each day of its life. For example, for an SSD with a size of 200 GB and a warranty period of 5 years, if DWPD is 1, then 200 GB may be written into the device every day for the next five years. That corresponds to 200 GB×365 days×5 years=365 TB of cumulative writes before the device is expected to fail. If DWPD is 10, then every single day 10×200 GB=2 TB may be written into the device. Endurance may alternatively be expressed as total bytes written (TBW), which measures total data writable into the drive over its lifetime. For example, for an SSD rated for 365 TBW, up to 365 TB data may be written before the drive is set for replacement. The guaranteed TBW may be provided by the vendor in their specifications. A target writes per day may be calculated using the TBW and target lifetime (e.g., a warranty of target lifetime such as 3-5 years). For example, for an SSD with a TBW of 120TB and a warranty period of 3 years, target daily writes may be calculated as 120 TB/3 years/365 days/1024=110 GB per day.

Normal operation of a flash memory may involve a large amount of writing (programming) and erasure of memory cells. Garbage collection ($G^C$) is an operation to manage memory utilization in a flash memory. When the free physical space in a flash memory gets low, GC may recover free space on the storage device to allow for new host data to be written. During GC, a flash block that contains pages with valid data and pages with stale data (garbage) is read. Pages with the valid data are preserved, by writing to another fresh block. The logical block address is then updated with the new location. Pages with stale data marked for deletion remain on the location in the old block. Then, the entire old block (which contains pages with the stale data) is erased. The erased block may be added to the free block pool and used for a new incoming write. Such data written to pages and block erasure may lead to write amplification (WA). A numerical WA metric may be determined using a ratio of the amount of data physically written to the flash memory (physical writes) to the amount of data the host originally intended to write (host writes). The actual physical writes are generally larger than the host writes, resulting in a WA metric greater than one.

The present document describes examples of memory devices, systems, methods, and machine-readable media for managing a memory device comprising a memory array having at least SLC data blocks and multiple-level cell (MLC) data blocks, a write buffer, and a memory controller configured to receive instructions from a host device. In sample embodiments, the memory controller executes instructions to perform operations including: enabling the write buffer to receive host data from the host device; upon receipt of a synchronize cache command, determining whether the write buffer is full of host data above a predetermined threshold (e.g., 805 of the available memory space of the write buffer); when the write buffer is full of host data above the predetermined threshold, flushing host data in the write buffer to an open MLC data block; and when the write buffer is not full of host data above the predetermined threshold, flushing host data in the write buffer to a block of memory in the SLC data block where it will be retained temporarily (in a "temporary SLC data block") pending the receipt of additional data in the write buffer.

In further sample embodiments, the processor further executes instructions to perform operations including, after flushing the host data in the write buffer to the temporary SLC data block, maintaining the host data in the write buffer and enabling the write buffer to receive additional host data from the host device, and upon a determination that the write buffer has been filled by the additional host data, transferring the host data in the write buffer to another open MLC data block. The processor further executes instructions to perform operations including transferring host data stored in the temporary SLC data block back to the write buffer to reconstitute the write buffer when host data in the write buffer has been lost.

In still further sample embodiments, flushing host data in the write buffer to the open MLC block comprises flushing all pages of data storage in the write buffer in a one-pass transfer to the open MLC data block. Also, flushing the host data in the write buffer to the temporary SLC data block comprises flushing one or more pages of data storage at a time from the write buffer to the temporary SLC data block. Flushing the host data in the write buffer to the temporary SLC data block may also comprise flushing one or more pages of data storage 4 kB at a time in accordance with the number of pages (e.g., 2, 4, 6, pages) of data that may be transferred at a time by a one-pass transfer program from the write buffer to the temporary SLC data block.

The following detailed description further includes a description of the corresponding methods and computer-readable storage devices including instructions that when executed by the memory device manages memory programming and particularly implementations of the synchronize cache command in NAND memory devices. In the following detailed description, reference is made to the accompanying drawings that form a part hereof and in which is shown, by way of illustration, specific embodiments. In the drawings, like numerals describe substantially similar components throughout the several views. Other embodiments may be utilized, and structural, logical, and electrical changes may be made without departing from the scope of the present disclosure. The following detailed description is, therefore, not to be taken in a limiting sense.

It is further noted that although embodiments are discussed in this document with reference to NAND media, the embodiments are not limited to NAND media and may be applied to NOR media. Furthermore, although some embodiments are discussed with reference to SSDs, the embodiments are not limited to SSDs, but may be used for other types of non-volatile storage devices such as nanowire memory. Ferro-electric transistor random access memory (FeTRAM), magnetoresistive random access memory (MRAM), flash memory, Spin Torque Transfer Random Access Memory (STTRAM), Resistive Random Access Memory, byte addressable 3-Dimensional (3D) Cross Point Memory. PCM (Phase Change Memory), and so forth.

FIG. 1 illustrates an example of an environment 100 including a host device 105 and a memory device 110 configured to communicate over a NAND communication interface. The host device 105 or the memory device 110 may be included in a variety of products 150, such as Internet of Things (IoT) devices (e.g., a refrigerator or other appliance, sensor, motor or actuator, mobile communication device, automobile, drone, etc.) to support processing, communications, or control of the product 150.

The memory device 110 includes a memory controller 115 and a memory array 120 including, for example, a number of individual memory die (e.g., a stack of 3D NAND die). In 3D architecture semiconductor memory technology, vertical structures are stacked, increasing the number of tiers, physical pages, and accordingly, the density of a memory device (e.g., a storage device). In an example, the memory device 110 may be a discrete memory or storage device component of the host device 105. In other examples, the memory device 110 may be a portion of an integrated circuit (e.g., system on a chip (SOC), etc.), stacked or otherwise included with one or more other components of the host device 105. In these examples, the memory device 110 communicates with host device 105 components via an interlink 111, such as a bus. Thus, as described herein, a host, or host device 105 operation is distinct from those of the memory device 110, even when the memory device 110 is integrated into the host device 105.

One or more communication interfaces (e.g., the interlink 111) may be used to transfer data between the memory device 110 and one or more other components of the host device 105, such as a Serial Advanced Technology Attachment (SATA) interface, a Peripheral Component Interconnect Express (PCIe) interface, a Universal Serial Bus (USB) interface, a UFS interface, an eMMC™ interface, or one or more other connectors or interfaces. The host device 105 may include a host system, an electronic device, a processor, a memory card reader, or one or more other electronic devices external to the memory device 110. In some examples, the host device 105 may be a machine having some portion, or all, of the components discussed in reference to the machine 1000 of FIG. 10.

The memory controller 115 may receive instructions from the host device 105, and may communicate with the memory array 120, such as to transfer data to (e.g., write or erase) or from (e.g., read) one or more of the memory cells, planes, sub-blocks, blocks, or pages of the memory array 120. The memory controller 115 is configured (e.g., hardware and/or software implementation) to perform the methods described herein, including the exemplary methods described below with reference to FIGS. 5-9. For example, the memory controller 115 stores instructions for performing the methods described herein. In the present example, the instructions are included in firmware of the controller, but may in some examples be stored elsewhere within the example managed memory device; or may also be implemented in circuitry, including one or more components or integrated circuits. For example, the memory controller 115 may include one or more memory control units, circuits, or components configured to control access across the memory array 120 and to provide a translation layer between the host device 105 and the memory device 110. Although the memory controller 115 is here illustrated as part of the memory device 110 package, other configurations may be employed, such as the memory controller 115 being a component of the host device 105 (e.g., as a discrete package on a system-on-a-chip of the host device 105 that is separate from the memory device 110), or even implemented via a central processing unit (CPU) of the host device 105.

The memory manager 125 may include, among other things, circuitry or firmware, such as several components or integrated circuits associated with various memory management functions. For purposes of the present description, example memory operation and management functions will be described in the context of NAND memory. Persons skilled in the art will recognize that other forms of non-volatile memory may have analogous memory operations or management functions. Such NAND management functions include wear leveling, garbage collection, reclamation, error detection or correction, block retirement, or one or more other memory management functions. The memory manager 125 may parse or format host commands (e.g., commands received from a host) into device commands (e.g., commands associated with operation of the memory array 120, etc.), or generate device commands (e.g., to accomplish various memory management functions) fir an array controller 135 or one or more other components of the memory device 110.

The memory manager 125 may include a set of management tables 130 configured to maintain various information associated with one or more components of the memory device 110 (e.g., various information associated with a memory array or one or more memory cells coupled to the memory controller 115). For example, the management tables 130 may include information regarding block age, block erase count, error history, or one or more error counts (e.g., a write operation error count, a read bit error count, a read operation error count, an erase error count, etc.) for one or more blocks of memory cells coupled to the memory controller 115. In certain examples, if the number of detected errors for one or more of the error counts is above a threshold, the bit error may be referred to as an uncorrectable bit error. The management tables 130 may maintain a count of correctable or uncorrectable bit errors, among other things. In an example, the management tables 130 may include translation tables or a logical-to-physical (L2P) mapping.

The array controller 135 may include, among other things, circuitry or components configured to control memory operations associated with writing data to, reading data from, or erasing one or more memory cells of the memory device 110 coupled to the memory controller 115. The memory operations may be based on, for example, host commands received from the host device 105, or internally generated by the memory manager 125 (e.g., in association with wear leveling, error detection or correction, etc.).

As described above, and as is further addressed below, the array controller 135 may include write buffer control (WBC) functionality 140, which may be implemented to, for example, efficiently manage memory transfers that may result from write buffer flushes as a result of synchronize cache-type commands. Array controller 135 may also include error correction code (ECC) functionality, implemented through an ECC engine or other circuitry configured to detect and/or correct errors associated with writing data to or reading data from one or more memory cells of the memory device 110 coupled to the memory controller 115. The memory controller 115 may be configured to actively detect and recover from error occurrences (e.g., bit errors, operation errors, etc.) associated with various operations or storage of data based on the ECC data maintained by the array controller 135. This enables the memory controller 115 to maintain integrity of the data transferred between the host device 105 and the memory device 110 or maintain integrity of stored data. Part of this integrity maintenance may include removing (e.g., retiring) failing memory resources (e.g., memory cells, memory arrays, pages, blocks, etc.) to prevent future errors.

The memory array 120 may include several memory cells arranged in, for example, devices, planes, sub-blocks, blocks, or pages. As one example, a 48 GB TLC NAND memory device may include 18,592 bytes (B) of data per page (16.384+2208 bytes), 1536 pages per block, 548 blocks per plane, and 4 or more planes per device. As another example, a 32 GB MLC memory device (storing two bits of data per cell (i.e., 4 programmable states)) may include 18,592 bytes (B) of data per page (16,384+2208 bytes), 1024 pages per block, 548 blocks per plane, and 4 planes per device, but with half the write time and twice the program/erase (PIE) cycles as a corresponding TLC memory device. Other examples may include other numbers or arrangements. In some examples, a memory device, or a portion thereof, may be selectively operated in SLC mode, or in a desired MLC mode (such as TLC, QLC, etc.).

In operation, data is typically written to or read from the NAND memory device 110 in pages and erased in blocks. However, one or more memory operations (e.g., mad, write, erase, etc.) may be performed on larger or smaller groups of memory cells, as desired. The data transfer size of a NAND memory device 110 is typically referred to as a page, whereas the data transfer size of a host is typically referred to as a sector.

In some examples, the memory array may comprise several NAND dies and one or more functions of the memory controller 115 for a particular NAND die may be implemented on an on-die controller on that particular die. Other organizations and delineations of control functionality may also be utilized, such as a controller for each die, plane, superblock, block, page, and the like.

Although a page of data may include several bytes of user data (e.g., a data payload including several sectors of data) and its corresponding metadata, the size of the page often refers only to the number of bytes used to store the user data. As an example, a page of data having a page size of 4 KB may include 4 KB of user data (e.g., 8 sectors assuming a sector size of 512 B) as well as a number of bytes (e.g., 32 B, 54 B, 224 B, etc.) of metadata corresponding to the user data, such as integrity data (e.g., error detecting or correcting code data), address data (e.g., logical address data, etc.), or other metadata associated with the user data.

Different types of memory cells or memory arrays 120 may provide for different page sizes or may require different amounts of metadata associated therewith. For example, different memory device types may have different bit error rates, which may lead to different amounts of metadata necessary to ensure integrity of the page of data (e.g., a memory device with a higher bit error rate may require more bytes of error correction code data than a memory device with a lower bit error rate). As an example, a MLC NAND flash device may have a higher bit error rate than a corresponding SLC NAND flash device. As such, the MLC device may require more metadata bytes for error data than the corresponding SLC device.

Figure 2:
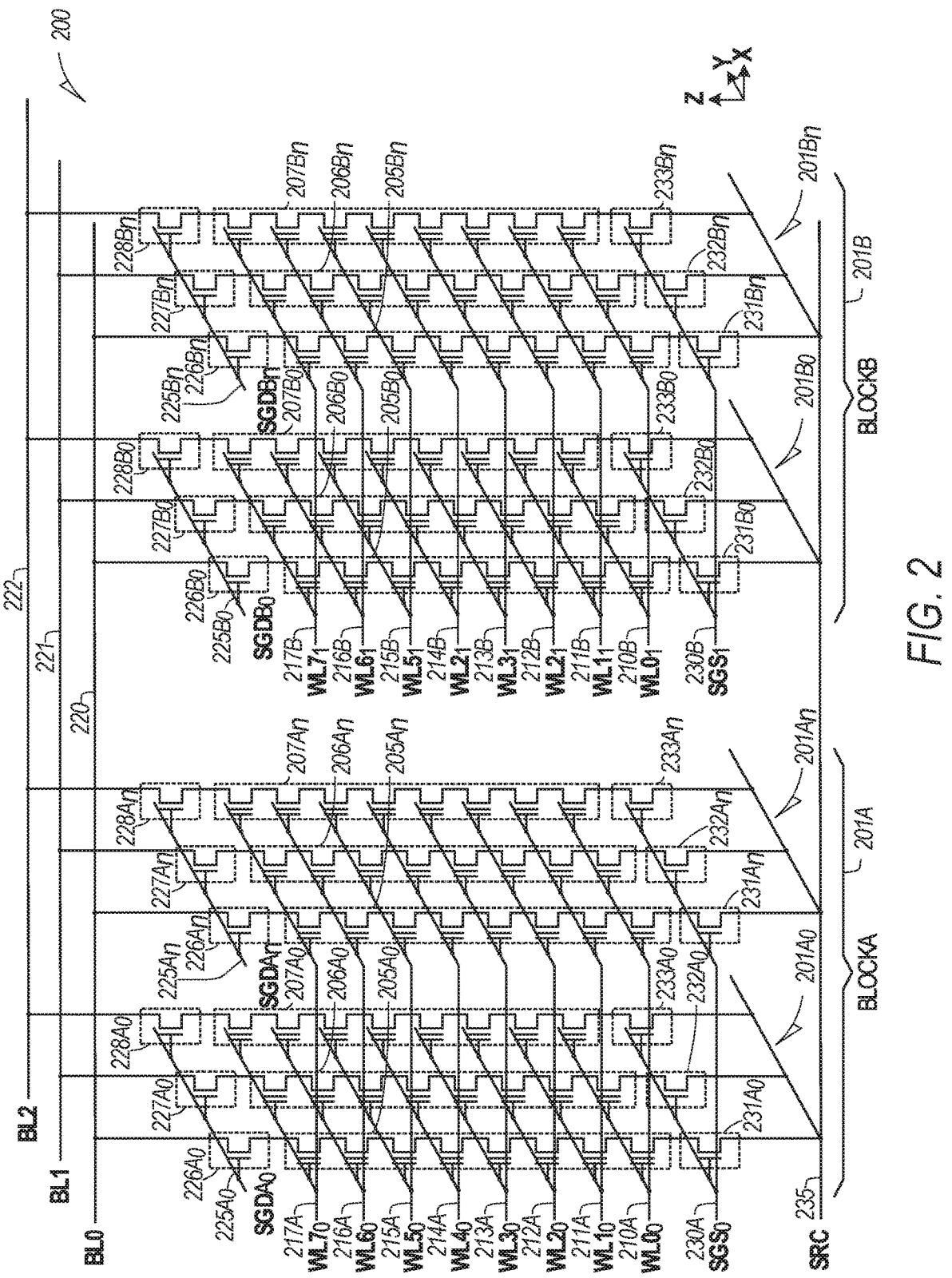
FIGS. 2-3 are schematic diagrams illustrating examples of NAND architecture semiconductor memory arrays.

FIG. 2 is a schematic diagram illustrating an example of a 3D NAND architecture semiconductor memory array 200 of a NAND memory device 110 of the type illustrated in FIG. 1, including a number of strings of memory cells (e.g., first-third $A_0$ memory strings $205A_0$-$207A_0$, first-third $A_n$ memory strings $205A_n$-$207A_n$, first-third $B_0$ memory strings $205B_0$-$207B_0$, first-third $B_n$ memory strings $205B_n$-$207B_n$, etc.), organized in blocks (e.g., block A 201A, block B 201B, etc.) and sub-blocks (e.g., sub-block $A_0$ 201$A_0$, sub-block $A_n$ 201$A_n$, sub-block $B_0$ 201$B_0$, sub-block $B_n$ 201$B_n$, etc.). The memory array 200 represents a portion of a greater number of similar structures that would typically be found in a block, device, or other unit of a memory device.

Each string of memory cells includes a number of tiers of charge storage transistors (e.g., floating gate transistors, charge-trapping structures, etc.) stacked in the Z direction, source to drain, between a source line (SRC) 235 or a source-side select gate (SGS) (e.g., first-third $A_0$ SGS $231A_0$-$233A_0$, first-third $A_n$ SGS $231A_n$-$233A_n$, first-third $B_0$ SGS $231B_0$-$233B_0$, first-third $B_n$ SGS $231B_n$-$233B_n$, etc.) and a drain-side select gate (SGD) (e.g., first-third $A_0$ SGD $226A_0$-$228A_0$, first-third $A_n$ SGD $226A_n$-$228A_n$, first-third $B_0$ SGD $226B_0$-$228B_0$, first-third $B_n$ SGD $226B_n$-$228B_n$, etc.). Each string of memory cells in the 3D memory array may be arranged along the X direction as data lines (e.g., bit lines (BL) BL0-BL2 220-222), and along the Y direction as physical pages.

Within a physical page, each tier represents a row of memory cells, and each string of memory cells represents a column. A sub-block may include one or more physical pages. A block may include several sub-blocks (or physical pages) (e.g., 128, 256, 384, etc.). Although illustrated herein as having two blocks, each block has two sub-blocks, each sub-block has a single physical page, each physical page has three strings of memory cells, and each string has eight tiers of memory cells. In other examples, the memory array 200 may include more or fewer blocks, sub-blocks, physical pages, strings of memory cells, memory cells, or tiers. For example, each string of memory cells may include more or fewer tiers (e.g., 16, 32, 64, 128, etc.), as well as one or more additional tiers of semiconductor material above or below the charge storage transistors (e.g., select gates, data lines, etc.), as desired. As an example, a 48 GB TLC NAND memory device may include 18,592 bytes (B) of data per page (16,384+2208 bytes). 1536 pages per block, 548 blocks per plane, and 4 or more planes per device.

Each memory cell in the memory array 200 includes a control gate (CG) coupled to (e.g., electrically or otherwise operatively connected to) an access line (e.g., word lines (WL) $WL0_0$-$WL7_0$ 210A-217A, $WL0_1$-$WL7_1$ 210B-217B, etc.), which collectively couples the control gates (CGs) across a specific tier, or a portion of a tier, as desired. Specific tiers in the 3D memory array, and accordingly, specific memory cells in a string, may be accessed or controlled using respective access lines. Groups of select gates may be accessed using various select lines. For example, first-third $A_0$ SGD $226A_0$-$228A_0$ may be accessed using an $A_0$ SGD line $SGDA_0$ 225$A_0$, first-third $A_n$ SGD $226A_n$-$228A_n$ may be accessed using an SGD line $SGDA_n$ 225$A_0$, first-third $B_0$ SGD $226B_0$-$228B_0$ may be accessed using a $B_0$ SGD line $SGDB_0$ 225$B_0$, and first-third $B_n$ SGD $226B_n$-$228B_n$ may be accessed using a $B_n$ SGD line $SGDB_n$ 225$B_n$. First-third $A_0$ SGS $231A_0$-$233A_0$ and first-third $A_n$ SGS $231A_n$-$233A_n$ may be accessed using a gate select line $SGS_0$ 230A, and first-third $B_0$ SGS $231B_0$-$233B_0$ and first-third $B_n$ SGS $231B_n$-$233B_n$ may be accessed via a gate select line $SGS_1$ 230B.

In an example, the memory array 200 may include several levels of semiconductor material (e.g., polysilicon, etc.) configured to couple the control gates (CGs) of each memory cell or select gate (or a portion of the CGs or select gates) of a respective tier of the array. Specific strings of memory cells in the array may be accessed, selected, or controlled using a combination of bit lines (BLs) and select gates, and the like, and specific memory cells at one or more tiers in the specific strings may be accessed, selected, or controlled using one or more access lines (e.g., WLs).

Figure 3:
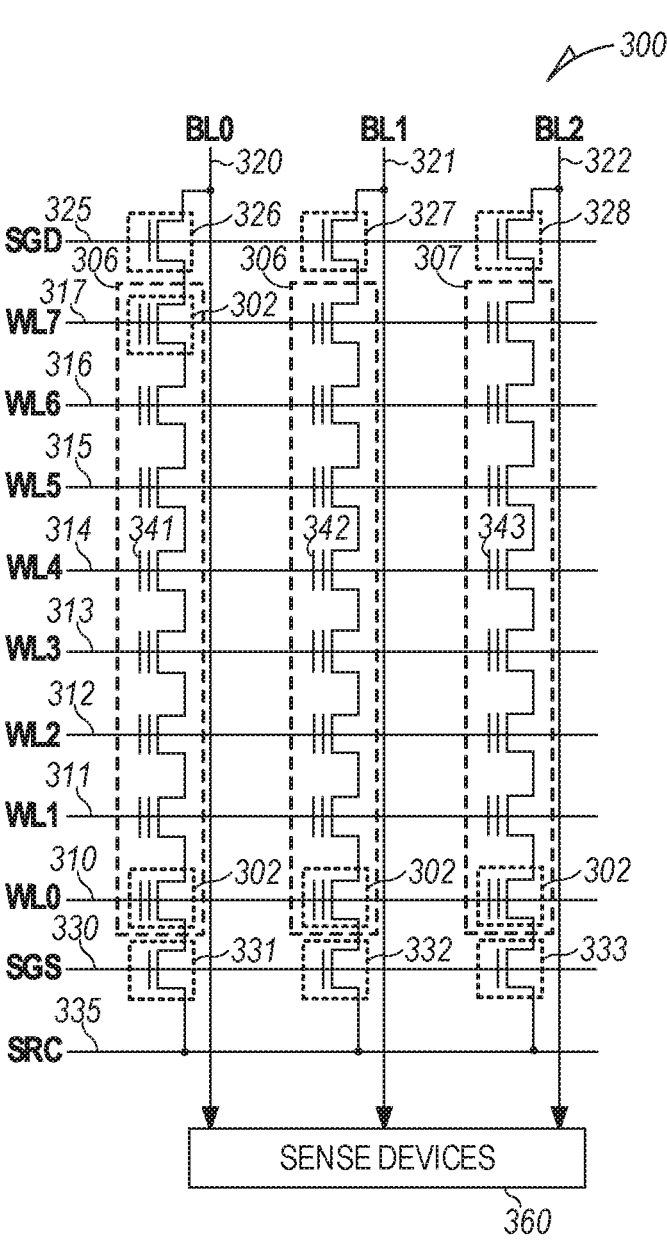

FIG. 3 illustrates an example schematic diagram of a portion of a NAND architecture semiconductor memory array 300 including multiple memory cells 302 arranged in a two-dimensional array of strings (e.g., first-third strings 305-307) and tiers (e.g., illustrated as respective word lines (WL) WL0-WL7 310-317, a drain-side select gate (SGD) line 325, a source-side select gate (SGS) line 330, etc.), and sense amplifiers or devices 360. For example, the memory array 300 may illustrate an example schematic diagram of a portion of one physical page of memory cells of a 3D NAND architecture semiconductor memory device, such as illustrated in FIG. 2.

Each string of memory cells is coupled to a source line (SRC) 335 using a respective source-side select gate (SGS) 330 (e.g., first-third SGS 331-333), and to a respective data line (e.g., first-third bit lines (BL) BL0-BL2 320-322) using a respective drain-side select gate (SGD) (e.g., first-third SGD 326-328). Although illustrated with eight tiers (e.g., using word lines (WL) WL0-WL7 310-317) and three data lines (BL0-BL2 326-328) in the example of FIG. 3, other examples may include strings of memory cells having more or fewer tiers or data lines, as desired.

In a NAND architecture semiconductor memory array, such as the example memory array 300, the state of a selected memory cell 302 may be accessed by sensing a current or voltage variation associated with a particular data line containing the selected memory cell. The memory array 300 may be accessed (e.g., by a control circuit, one or more processors, digital logic, etc.) using one or more drivers. In an example, one or more drivers may activate a specific memory cell, or set of memory cells, by driving a particular potential to one or more data lines (e.g., bit lines BL0-BL2), access lines (e.g., word lines WL0-WL7), or select gates, depending on the type of operation desired to be performed on the specific memory cell or set of memory cells.

To program or write data to a memory cell, a programming voltage (Vpgm) (e.g., one or more programming pulses, etc.) may be applied to selected word lines (e.g., WL4), and thus, to a control gate of each memory cell coupled to the selected word lines (e.g., first-third control gates (CGs) 341-343 of the memory cells coupled to WL4). Programming pulses may begin, for example, at or near 15V, and, in certain examples, may increase in magnitude during each programming pulse application. While the program voltage is applied to the selected word lines, a potential, such as a ground potential $V_{SS}$, may be applied to the data lines (e.g., bit lines) and substrates (and thus the channels, between the sources and drains) of the memory cells targeted for programming, resulting in a charge transfer (e.g., direct injection or Fowler-Nordheim (FN) tunneling, etc.) from the channels to the floating gates of the targeted memory cells.

In contrast, a pass voltage ($V_{PASS}$) may be applied to one or more word lines having memory cells that are not targeted for programming, or an inhibit voltage (e.g., $V_{CC}$ may be applied to data lines (e.g., bit lines) having memory cells that are not targeted for programming, for example, to inhibit charge from being transferred from the channels to the floating gates of such non-targeted memory cells. The pass voltage may be variable, depending, for example, on the proximity of the applied pass voltages to a word line targeted for programming. The inhibit voltage may include a supply voltage ($V_{CC}$), such as a voltage from an external source or supply (e.g., a battery, an AC-to-DC converter, etc.), relative to a ground potential Vss.

As an example, if a programming voltage (e.g., 15V or more) is applied to a specific word line, such as WL4, a pass voltage of 10V may be applied to one or more other word lines, such as WL3, WL5, and the like, to inhibit programming of non-targeted memory cells, or to retain the values stored on such memory cells not targeted for programming. As the distance between an applied program voltage and the non-targeted memory cells increases, the pass voltage required to refrain from programming the non-targeted memory cells may decrease. Fr example, where a programming voltage of 15V is applied to WL4, a pass voltage of 10V may be applied to WL3 and WL5, a pass voltage of 8V may be applied to WL2 and WL6, a pass voltage of 7V may be applied to WL1 and WL7, and so forth. In other examples, the pass voltages, or number of word lines, and the like, may be higher or lower, or more or less.

The sense amplifiers 360, coupled to one or more of the data lines (e.g., first, second, or third bit lines (BL0-BL2) 320-322), may detect the state of each memory cell in respective data lines by sensing a voltage or current on a particular data line.

Between applications of one or more programming pulses (e.g., Vpgm), a verify operation may be performed to determine if a selected memory cell has reached its intended programmed state. If the selected memory cell has reached its intended programmed state, it may be inhibited from further programming. If the selected memory cell has not reached its intended programmed state, additional programming pulses may be applied. If the selected memory cell has not reached its intended programmed state after a particular number of programming pulses (e.g., a maximum number), the selected memory cell, or a string, block, or page associated with such selected memory cell, may be marked as defective.

To erase a memory cell or a group of memory cells (e.g., erasure is typically performed in blocks or sub-blocks), an erasure voltage (Vers) (e.g., typically Vpgm) may be applied to the substrates (and thus the channels, between the sources and drains) of the memory cells targeted for erasure (e.g., using one or more bit lines, select gates, etc.), while the word lines of the targeted memory cells are kept at a potential, such as a ground $V_{SS}$, resulting in a charge transfer (e.g., direct injection or Fowler-Nordheim (IN) tunneling, etc.) from the floating gates of the targeted memory cells to the channels.

Figure 4:
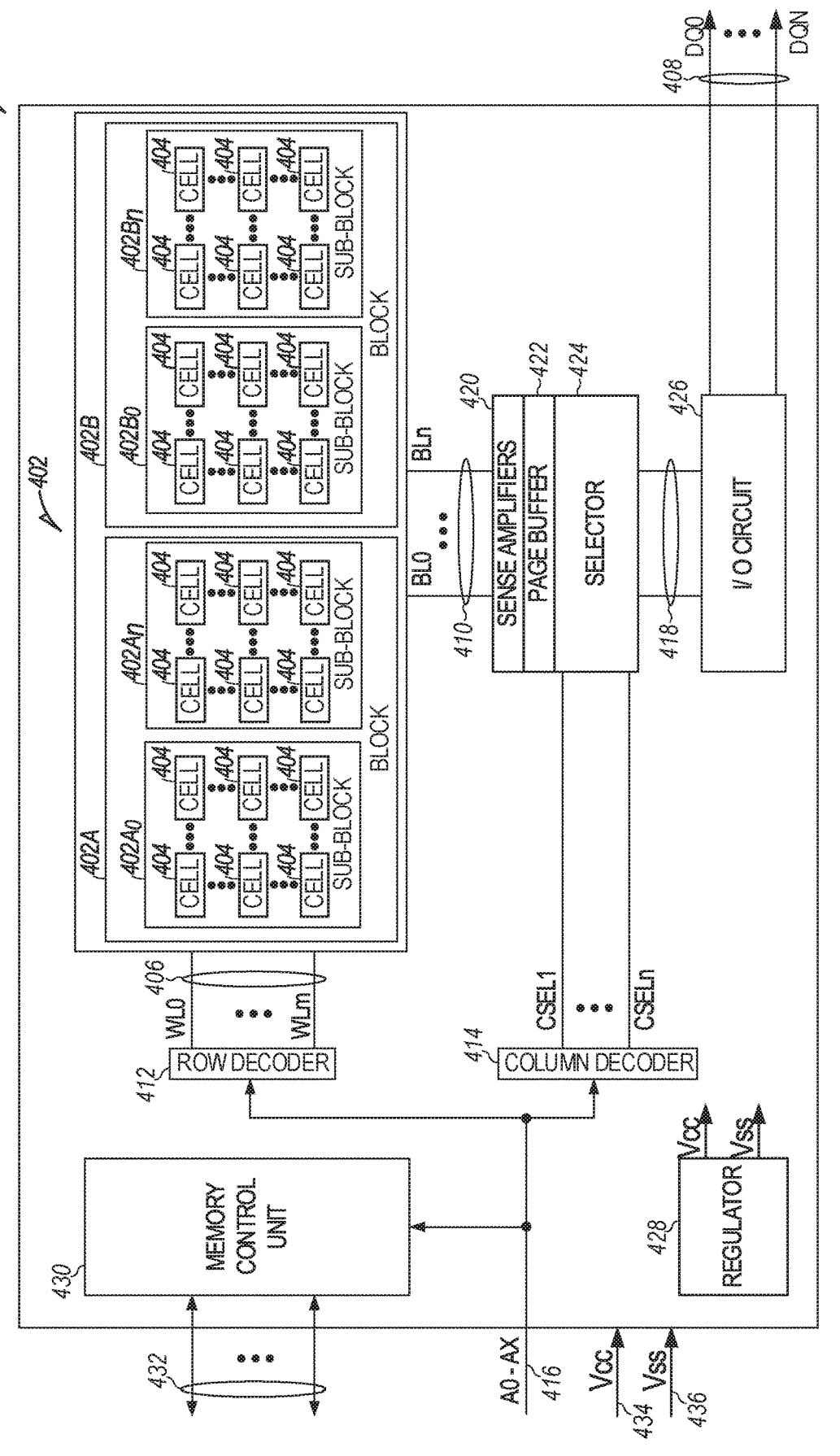
FIG. 4 is a block diagram illustrating an example of a memory module.

FIG. 4 is a block diagram illustrating an example of a memory device 400 of the type illustrated in FIG. 1, including a memory array 402 having multiple memory cells 404, and one or more circuits or components to provide communication with, or perform one or more memory operations on, the memory array 402. The memory device 400 may include a row decoder 412, a column decoder 414, sense amplifiers 420, a page buffer 422, a selector 424, an input/output (I/O) circuit 426, and a memory control unit 430.

The memory cells 404 of the memory array 402 may be arranged in blocks, such as first and second blocks 402A, 402B. Each block may include sub-blocks. For example, the first block 402A may include first and second sub-blocks 402A₀, 402Aₙ, and the second block 402B may include first and second sub-blocks 402B₀, 402Bₙ. Each sub-block may include a number of physical pages, with each page including a number of memory cells 404. Although illustrated herein as having two blocks, with each block having two sub-blocks, and each sub-block having a number of memory cells 404, in other examples, the memory array 402 may include more or fewer blocks, sub-blocks, memory cells, and the like. In other examples, the memory cells 404 may be arranged in a number of rows, columns, pages, sub-blocks, blocks, and the like, and accessed using, for example, access lines 406, first data lines 410, or one or more select gates, source lines, and so forth.

The memory control unit 430 may control memory operations of the memory device 400 according to one or more signals or instructions received on control lines 432, including, for example, one or more clock signals or control signals that indicate a desired operation (e.g., write, read, erase, etc.), or address signals (A0-AX) received on one or more address lines 416. One or more devices external to the memory device 400 may control the values of the control signals on the control lines 432, or the address signals on the address line 416. Examples of devices external to the memory device 400 may include, but are not limited to, a host, a memory controller, a processor, or one or more circuits or components not illustrated in FIG. 4.

The memory device 400 may use access lines 406 and first data lines 410 to transfer data to (e.g., write or erase) or from (e.g., read) one or more of the memory cells 404. The memory control unit 430 may include a state machine 431 coupled to the row decoder 412, the column decoder 414, and the I/O circuit 426. The state machine 431 may also output status data of the flash memory such as READY/BUSY or PASS/FAIL. In some designs, the state machine 431 may be configured to manage the programming process. The row decoder 412 and the column decoder 414 may receive and decode the address signals (A0-AX) from the address line 416, determine which of the memory cells 404 are to be accessed, and provide signals to one or more of the access lines 406 (e.g., one or more of multiple word lines (WL0-WLm)) or the first data lines 410 (e.g., one or more of multiple bit lines (BL0-BLn)), such as described above.

The memory device 400 may include sense circuitry, such as the sense amplifiers 420, configured to determine the values of data on (e.g., read), or to determine the values of data to be written to, the memory cells 404 using the first data lines 410. For example, in a selected string of memory cells 404, one or more of the sense amplifiers 420 may read a logic level in the selected memory cell 404 in response to a mad current flowing in the memory array 402 through the selected string to the data lines 410.

One or more devices external to the memory device 400 may communicate with the memory device 400 using the I/O lines (DQ0-DQN) 408, address lines (A0-AX) 416, or control lines 432. The input/output (I/O) circuit 426 may transfer values of data in or out of the memory device 400, such as in or out of the page buffer 422 or the memory array 402, using the I/O lines 408, according to, for example, the control lines 432 and address lines 416. The page buffer 422 may store data received from the one or more devices external to the memory device 400 before the data is programmed into relevant portions of the memory array 402 or may store data read from the memory array 402 before the data is transmitted to the one or more devices external to the memory device 400.

The column decoder 414 may receive and decode address signals (A0-AX) 416 into one or more column select signals (CSEL1-CSELn). The selector 424 (e.g., a select circuit) may receive the column select signals (CSEL1-CSELn) and select data in the page buffer 422 representing values of data to be read from or to be programmed into memory cells 404. Selected data may be transferred between the page buffer 422 and the I/O circuit 426 using second data lines 418. In some examples a flash translation layer (not shown) may map addresses provided by a host to physical memory addresses used by the row decoder 412 and column decoder 414 to read data in the memory array 402.

The memory control unit 430 may receive positive and negative supply signals, such as a supply voltage $V_{CC}$ 434 and a ground potential $V_{SS}$ 436, from an external source or supply (e.g., an internal or external battery, an AC-to-DC converter, etc.). In certain examples, the memory control unit 430 may include a regulator 428 to internally provide positive or negative supply signals.

As previously described, a memory cell of a memory device may be arranged as either an SLC configured to store only a single bit of data, or an MLC that stores two or more bits of data. For example, a TLC may store three bits of data per cell, and a QLC may store four bits of data per cell. Compared to MLC (e.g., TLC or QLC) storage, SLC cells generally store less data, and manufacturing memory devices in capacities suitable for use as a storage device using just SLC memory cells is less cost effective. However, SLC memory cells may offer better performance with higher reliability. For example SLC cells may be written to with fewer programming cycles, thereby reducing the chances of corruption from an unexpected power loss during programming. A compromise solution to memory management is using an SLC cache, where some cells may be configured as SLC and other cells as MLC. For example, data may be first written to the SLC, and later transferred to the MLC when the memory device is not busy (e.g., idle state). In some examples, when receiving a host write request, the memory controller may check if there is free SLC cache. Data may then be written to the SLC cache if there is free SLC cache, or instead written to MLC storage directly if no free SLC cache is available. The SLC cache mechanism provides a balance between the speed and reliability of SLC memory cells with the storage capacity of MLC memory cells. In some example memory devices, the memory cells may be reconfigurable by firmware between SLC and MLC, and the cache size may vary during usage (dynamic size SLC cache). For example, the SLC cache size may vary based upon how full the memory device is (device utilization). As the device fills up, memory cells configured as SLC cache are migrated to MLC to increase total data storage capacity.

The use of SLC cache may lead to WA because same data is written twice to the physical media of the flash memory, first to the SLC cache and then to the MIX storage. A WA metric may be determined as the actual amount of information physically written to the storage media relative to the logical amount that a host intends to write over the life of that data as it moves throughout the memory device. The larger the SLC cache, the more likely a write request is to be serviced by SLC cache, and the greater the likelihood of an increase in WA. In addition to the use of SLC cache, garbage collection (GC) may also lead to a large WA.

As noted above, the architecture of a NAND flash memory requires data to be read and programmed in pages, typically between 4 KB and 16 KB in size, and to be erased at the level of entire blocks consisting of multiple pages and MB in size. When a block is erased, all the cells are logically set to 1. Data may only be programmed in one pass to a page in a block that was erased. Any cells that have been set to 0 by programming may only be reset to 1 by erasing the entire block, which means that before new data may be programmed into a page that already contains data, the current contents of the page plus the new data is copied to a new, erased page. If a suitable page is available, the data may be written to it immediately. However, if no erased page is available, a block is erased before copying the data to a page in that bkock. The old page is then marked as invalid and is available for erasing and reuse.

As noted above, the UFS datasheet (JESD220C) specifies that a device must flush its SRAM buffer (cache) data into a storage medium (e.g., MLC of NAND flash) when receiving the synchronize cache command from its host. The systems and methods described herein implement the synchronize cache command by adding a temporary SLC block to synchronize the cache to maximize one-pass transfer efficiency. For purposes of the present example implementation, the following description refers to a "synchronize cache" command. This terminology is intended to refer to any command to a managed NAND device from a host that the device flush the write buffer to memory, without regard to any specific standard under which the managed NAND device operates. Thus the "synchronize cache" command under the identified UFS standard is merely an example.

Figure 5:
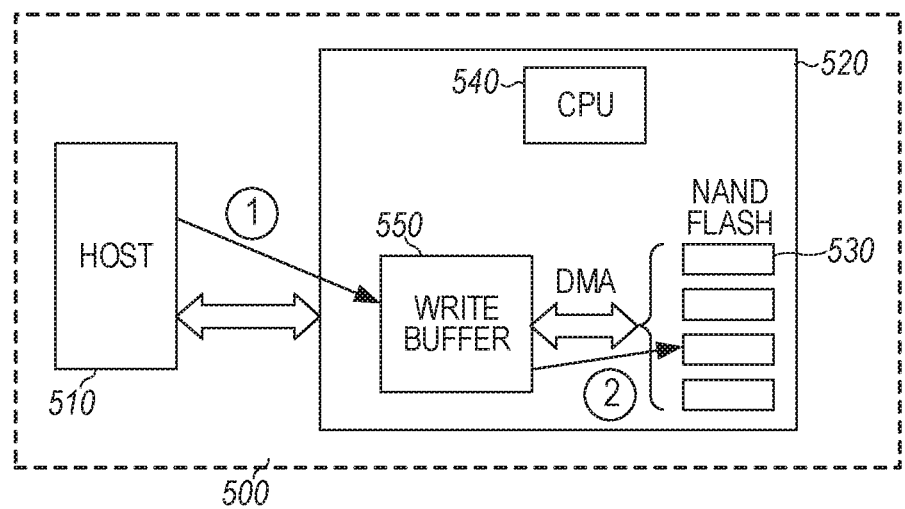
FIG. 5 illustrates an example of the environment of FIG. 1 including a host device, a memory device including NAND flash memory, a memory controller including a central processing unit (CPU), and a write buffer.

FIG. 5 illustrates an example system 500, as an example implementation of the environment 100 of FIG. 1 including a host device 510 and a memory device 520 including NAND flash memory 530 and a memory controller 115 (FIG. 1) including CPU 540. As illustrated, the memory device 520 in the embodiment of FIG. 5 may be constructed, for example, generally in the manner described for memory device 400 in FIG. 4. However, memory device 520 may further include an SRAM (write) buffer 550 that stores host data from the host device 510 for direct memory access (DMA) transfer into the NAND flash memory 530 when the SRAM buffer 550 is full or as otherwise commanded (e.g., by a synchronize cache command). In sample embodiments, the write buffer 550, NAND flash memory 530, and CPU 540 are incorporated into the same application-specific integrated circuit (ASIC). As illustrated in FIG. 5, data from host device 510 is written into the write buffer 550550 at (1) and the host data is flushed by DMA transfer from the write buffer 550 into the NAND flash memory 530 when the data size in the write buffer 550 reaches the size for one-pass transfer ("one-pass program size") or some other device command or condition requires the data to be flushed from the write buffer 550 even though the write buffer 550 is not full (e.g., upon receiving the synchronize cache command from the host device 510). As noted above, the UFS datasheet (JESD220C) specifies that a device must flush its SRAM buffer (cache) data into a storage medium (e.g., NAND flash) when receiving the synchronize cache command from its host. Upon receipt of the synchronize cache command, the device flushes valid data in its write buffer 550 into the NAND flash memory 530 no matter how much or how little valid data is in the write buffer 550.

Figure 6:
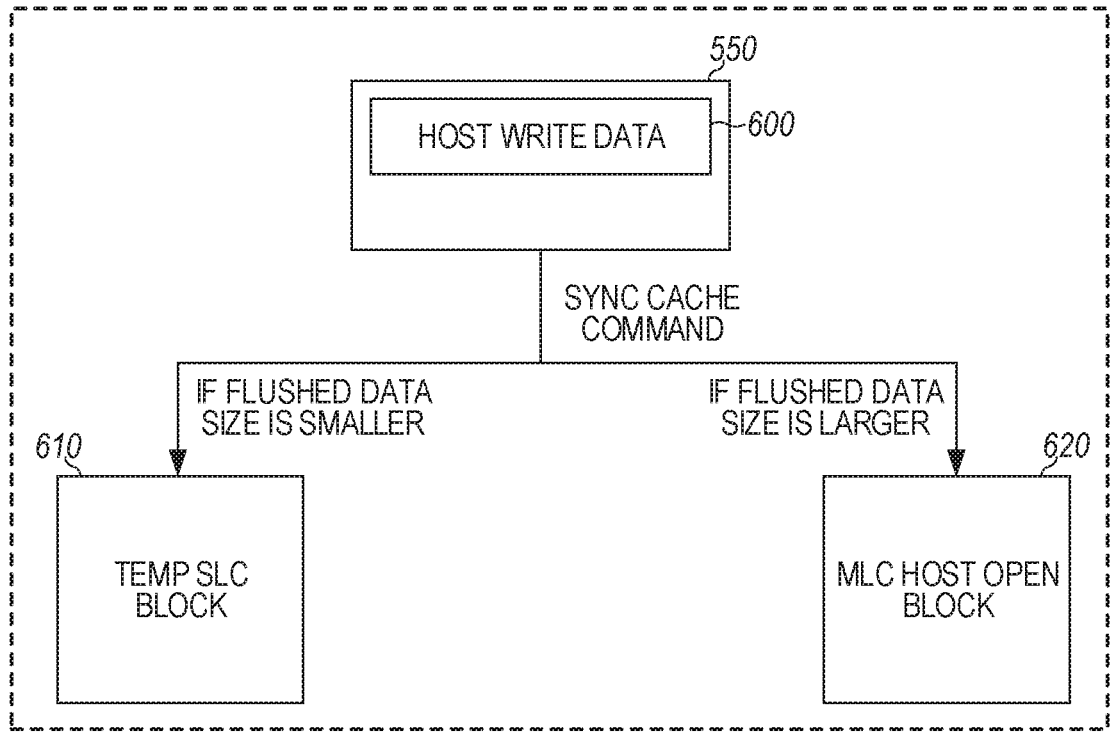
FIG. 6 illustrates a block diagram showing how host data is flushed from the SRAM write buffer upon receipt of a synchronize cache command in sample embodiments.

As implemented in sample embodiments, upon receipt of a synchronize cache command, the memory controller's CPU 540 implements a program to check the valid host data size in the SRAM write buffer 550550. For example, as illustrated in FIG. 6, host data 600 is flushed from the SRAM write buffer 550 illustrated in FIG. 5 upon receipt of a synchronize cache command in accordance with the amount of valid host data 600 stored in the write buffer 550. As illustrated, if the valid data size is greater than a predetermined value (for example, 80% of the size of the write buffer 550), then the valid host data 600 in the SRAM write buffer 550 is flushed directly into the open TLC block 620, for example, in accordance with a host TLC open block one-pass program for a single pass transfer. On the other hand, if the valid host data size in the write buffer 550 is less than a predetermined value, then the host data 600 is not flushed to the TLC of the NAND flash memory 530 but is instead flushed into a temporary SLC block 610 directly to satisfy the UFS command specification for the synchronize cache command. However, the host data 600 is still maintained in the SRAM write buffer 550. As a result, the SRAM write buffer 550 may receive additional data until it is full. Once full, all of the host data 600 in the SRAM write buffer 550550 may be transferred to a TLC open block 620 in a one-pass transfer. At this time, data in the temporary SLC block 610 becomes invalid. However, it will be appreciated that if there is a power loss or some other event causing the host data 600 in write buffer 550 to be lost, the lost host data may still be recovered from the temporary SLC block 610. It will also be appreciated that the data may be flushed to any MLC open block besides a TLC open block 620.

In sample embodiments, the host TLC open block one-pass transfer program is a page line (the page cross die and cross plane) adapted to improve the sequential write performance. In order to increase the sequential write performance, the programing on a NAND die is in parallel and in a multi-plane mode, which means that the smallest program unit (one-pass program size as described above) is the die number multiplied by the plane number multiplied by the smallest program physical unit per die. In a sample embodiment including an advanced 3D TLC NAND, a low page (LP)-up page (UP)-extra page (XP) one pass program is used to improve the NAND program efficiency. In this case, the NAND host provides LP, UP, and XP three-page data and then programs them together into the NAND array. The NAND host issues a program command (LP) to the NAND to transfer LP data to the NAND, issues a program command (UP) to the NAND to transfer UP data to the NAND, and issues a program command (XP) to the NAND to transfer XP data to the NAND. The NAND host also issues a program confirmation command to the NAND. The NAND records the LP/UP/XP into NAND array cells together after receiving the program confirmation command.

For example, for an SRAM write buffer 550 of a managed memory device 520, such as a UFS 3.0 NAND flash that supports a one-pass TLC program, a one-pass TLC program for a 4-die, 2-plane device requires 4 (die)×3 (pages)×2 (planes)×16 (KB page size)=384 KB. Similarly, a one-pass TLC program for a 4-die, 4-plane device requires 4 (die)×3 (pages)×4 (planes)×16 (KB page size)=768 KB. However, the write buffer 550 may contain small data chunks of host data 600 that are much less than the one-pass TLC program size (384 KB or 768 KB) that is flushed into the TLC of the NAND flash memory 530 upon receipt of the synchronize cache command. For example, there may be as little as 4 KB (the minimum host write data size) of host data 600 in the write buffer 550. The synchronize cache command may cause the write buffer 550 to flush this 4 KB of host data 600 into the open TLC block 620, which results in 380 kB or 764 KB physical size being wasted with padding dummy data. As a result, the TBW is increased substantially if there are a significant number of synchronize cache commands in the usage model for the NAND memory system 400. Moreover, padding dummy data for the synchronize cache command will cause a small valid data ratio in a closed data block of the TLC NAND, which triggers more GC operations in the system, further reducing system efficiency.

In accordance with the sample embodiments, such inefficiencies are addressed using the temporary SLC block 610, which is programmed in a single die and a single plane mode. The one-pass program size for the temporary SLC block 610 is just one single page, and not a page line. In such a configuration, if the same 4 KB (the minimum host write data size) of host data 600 is to be flushed from the write buffer 550, there is only 12 KB of physical page size waste for the flushed page. On the other hand, if the temporary SLC block 610 is adapted to support programming 4 times on the same page (once for each plane) without damaging the data, the padding dummy data size could be zero. Since the synchronized data is still in the write buffer 550, there is no need to fold the data stored in the temporary SLC block 610 into the host open TLC block 620. Also, in such a case, the valid data ratio of the host open TLC block 620 is not decreased by the synchronize cache command and the following GC will not be increased. Moreover, since the SLC program time (e.g., 200 µsec) is much lower than the TLC one-pass program time (e.g., 2000 µsec), the synchronize cache command latency is significantly improved as well.

In sample embodiments, the temporary SLC block 610 is selected from the free block list in the user data space. When the temporary SLC block 610 is programed fully, it is returned to the free block list again and is never closed as a data block.

As noted, the host data 600 is maintained in the SRAM write buffer 550 after being flushed into the temporary SLC block 610. If there is no clear operation on the SRAM write buffer 550 (e.g., power has been cut to the write buffer 550), there is no need to read flushed host data from the temporary SLC block 610 and the temporary SLC block 610 becomes invalid. However, if there is a clear operation on the SRAM write buffer 550, the flushed host data may be read into the SRAM write buffer 550 from the temporary SLC block 610 to rebuild the buffer data after a data loss by the write buffer 550. The temporary SLC block 610 may thus be used to rebuild the host data in the SRAM write buffer 550 when necessary, as in the case of a power loss.

It has been observed that there are many synchronize cache commands in a real usage mode of a typical NAND memory system 400. For example, in a usage mode test of a 2-8 two pass TLC program NAND device having a one-pass program size of 128 KB and 256 KB, the overall WA was measured as 3.92 based on measured values when the host data is written to the TLC directly. Most of the WA resulted from padding dummy data in the TLC write responsive to the synchronize cache command. It will be appreciated that a larger WA means a smaller TBW, where TBW= (total NAND valid written size)/WA. Also, a longer synchronize cache command latency was observed. For example, in the 2-8 two pass TLC program, the XP-UP one pass program time (tPROG) is already over 2 ms, which results in a relative long synchronize cache command latency. In other UFS 3.0 NAND one-pass TLC programs, the LP-UP-XP one-pass program time (tPROG) may be over 2.4 ms.

The UFS 3.0 turbo write feature gives the host more control over data written to the SLC cache blocks. When the data turbo write is disabled, the host data 600 is written directly to the TLC open block 620. In UFS 2.1, if there is idle time, the host data is written to the SLC cache block to avoid massive padding by dummy data. However, the above-mentioned inefficiencies created by the synchronize cache command are not addressed.

As NAND technology evolves to include more planes (2 planes→4 planes→6 planes) and more bits per cell (MLC→TLC→QLC), a one-pass program (e.g., LP, UP, and XP) is increasingly desired to improve the NAND programming speed. However, the NAND physical page size (NAND program unit) is typically 16 kB while the managed NAND host smallest write size is 4 KB (one logical block address (LBA)), which leads to the afore-mentioned inefficiencies.

Figure 7:
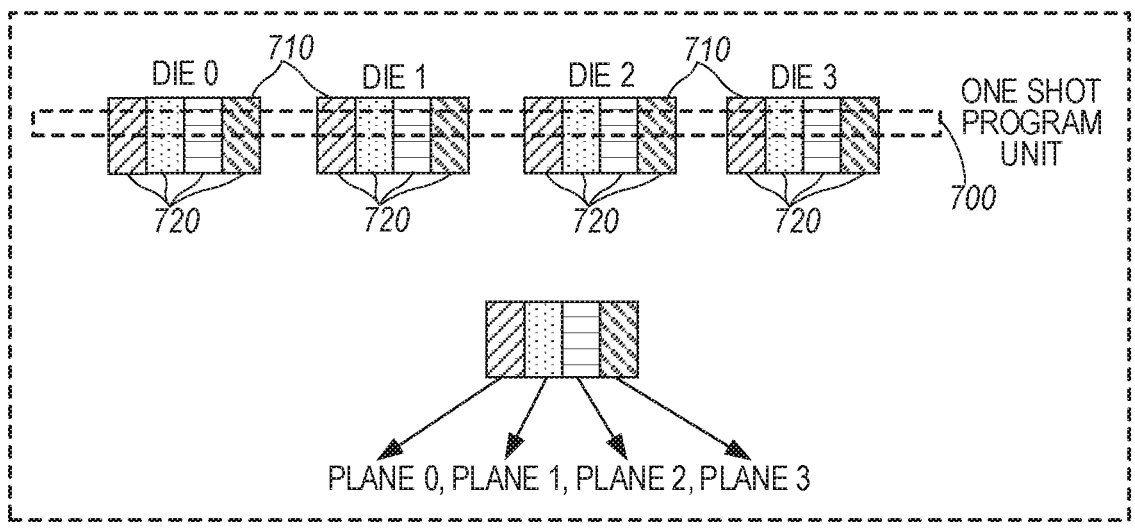
FIG. 7 illustrates a one-pass transfer program unit in a managed NAND device having four dies in a sample embodiment.

FIG. 7 illustrates a one-pass program unit in a managed NAND device of the type illustrated in FIG. 1, having 4 dies.

Figure 8:
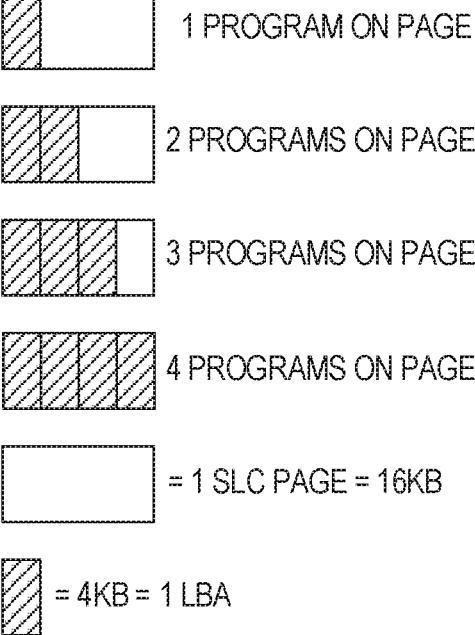
FIG. 8 illustrates flushing of the host data into the temporary single-level cell (SLC) block 4 kB at a time when the NAND memory supports several programs per page in sample embodiments.

As illustrated, the one-pass program unit 700 includes all four dies (Die 0, Die 1, Die 2, and Die 3) 710 as well as the 4 planes (plane 0, plane 1, plane 2, and plane 3) 720 within each die. Each plane contains 3 pages, and each page includes 16 kB. Thus, the one-pass program in this example transfers 4×4×3×16 kB=768 kB in a one-pass transfer. As noted above, the write buffer 550 may store as little as 4 KB of valid host data 600. Without the temporary SLC block 610 for receiving the flushed host data in response to a synchronize cache command, the CPU 540 would pad 764 KB of dummy data into the NAND flash memory 530, which is a big waste of the NAND resources. On the other hand, if there is temporary SLC block 610 for handling the synchronize cache command, the host data would be flushed into the temporary SLC block 610 (in a single die and single plane program) 4 kB at a time in accordance with the number of one-pass programs supported per page as shown in FIG. 8. Accordingly, there is no need to pad dummy data if the NAND flash memory 530 supports several programs per page as illustrated in FIG. 8. On the other hand, if the NAND memory cannot support several programs per page for the temporary SLC block 610, only 12 KB dummy data is padded to complete the page, which is much smaller than programming the host data into the TLC block 620.

Figure 9:
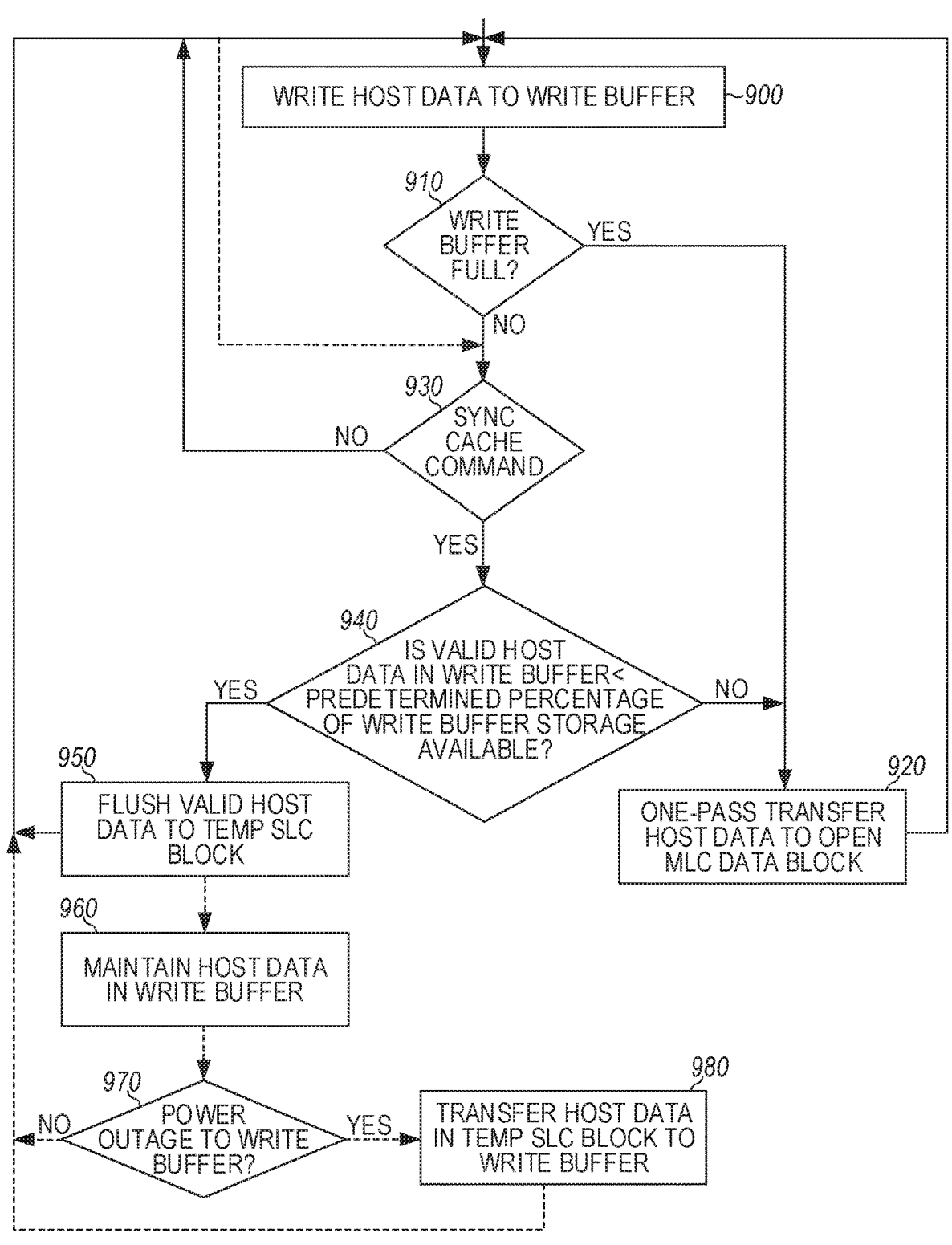
FIG. 9 illustrates a flow chart of an implementation of a memory management process including processing of a synchronization cache command in a sample embodiment.

FIG. 9 illustrates a flow chart of an implementation of a memory management process for a NAND memory device 520, for example of the type illustrated in FIG. 1, including processing of a synchronization cache command by the memory controller 115 in a sample embodiment. As illustrated, the host device 510 writes data to the write buffer 550 at 900. If the memory controller 115 establishes at 910 that the write buffer 550 is full of valid host data 600 above a predetermined threshold, the host data 600 in the write buffer 550 is transferred in a one-pass transfer to an open MLC data block at 920. The write buffer 550 then continues to receive new host data 600 from the host device 510. On the other hand, when it is determined at 910 that the write buffer 550 is not full, the memory controller 115 checks at 930 if a synchronize cache command has been received. If not, the write buffer 550 continues to receive host data 600 from the host device 510. Conversely, as indicated by the dashed line, a synchronize cache command may be received from the host device 510 without first checking the status of the write buffer 550.

In either case, upon receipt of a synchronize cache command at 930, the memory controller 115 checks at 940 if the amount of valid host data 600 stored in the write buffer 550 is less than or greater than a predetermined percentage (e.g., 80%) of the available storage in the write buffer 550. If the amount of valid host data 600 stored in the write buffer 550 exceeds the predetermined percentage of the available storage in the write buffer 550, the host data 600 in the write buffer 550 is transferred to an open MLC data block 620 by a one-pass transfer at 920, and the write buffer 550 resumes receipt of new host data 600 from the host device 510. On the other hand, if the amount of valid host data 600 stored in the write buffer 550 is less than the predetermined percentage of the available storage in the write buffer 550, the valid host data 600 in the write buffer 550 is flushed to a temporary SLC buffer 610 at 950. Optionally, the host data is maintained in the write buffer 550 at 960. By saving the host data in the write buffer 550, if a power outage or some other disruption to the operation of the write buffer 550 that causes data loss is detected at 970, the host data 600 that was flushed to the temporary SLC buffer 610 may be transferred back to the write buffer 550 at 980 to reconstitute the write buffer 550 when host data in the write buffer 550 has been lost. The write buffer 550 may then continue to receive host data 600 at 900 for resumption of the memory management process.

The use of a temporary SLC buffer 610 as described herein has several advantages. For example, the temporary SLC block 620 may be programmed in a single die mode and eliminate padding by a significant amount of dummy data. Also, since SLC program performance is significantly faster than MLC program performance, the synchronize cache command latency may be improved. Moreover, since flushing the host data to the temporary SLC buffer 610 is performed strictly to follow the synchronize cache command specification and the host data is retained in the SRAM write buffer 550 while the SRAM write buffer 550 waits for more host data 600, any host data 600 in the SRAM write buffer 550 that has been lost may be rebuilt from the host data stored in the temporary SLC block 610, which retains its data in the event of a power outage.

Figure 10:
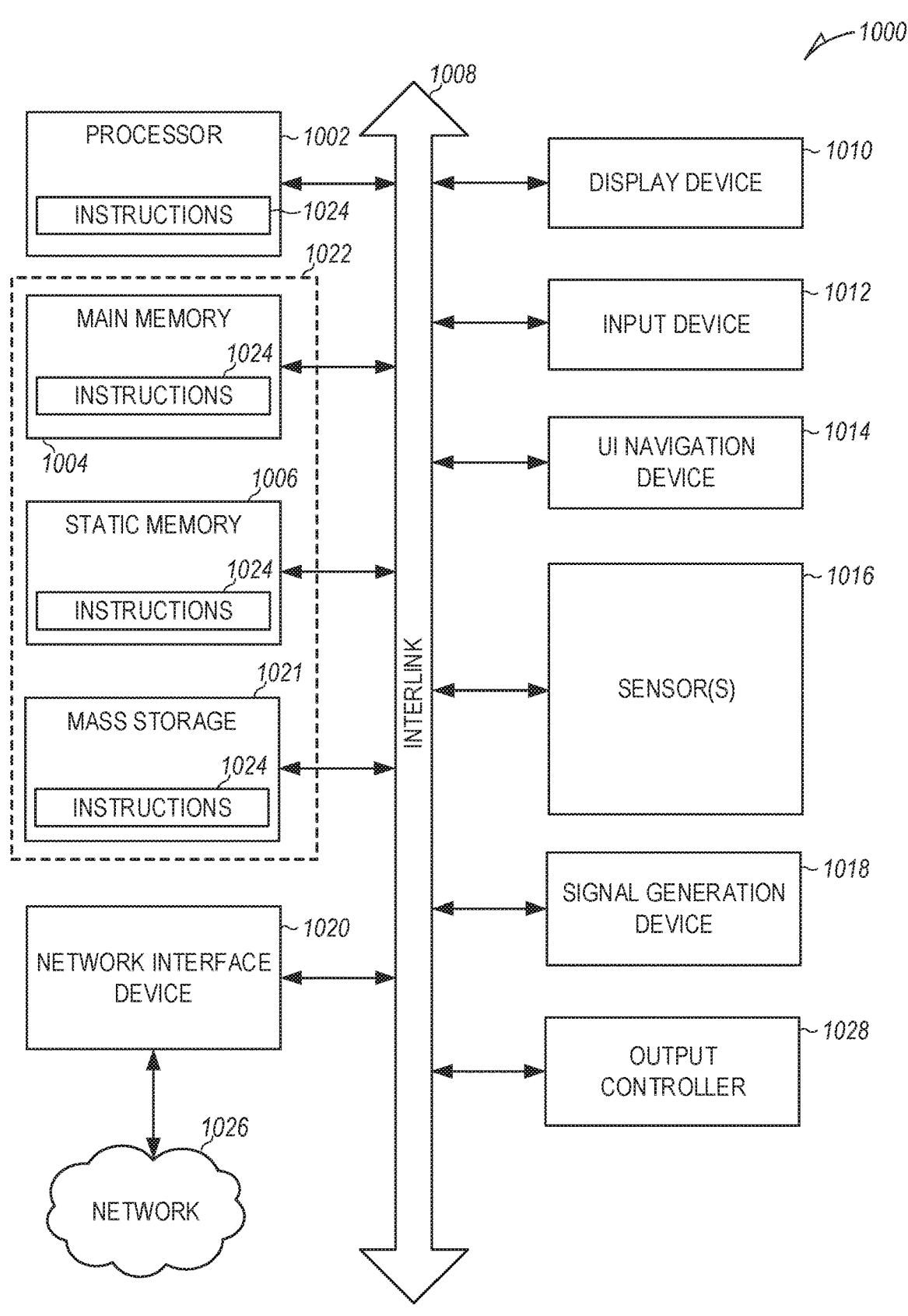
FIG. 10 is a block diagram illustrating an example of a machine upon which one or more embodiments may be implemented.

FIG. 10 illustrates a block diagram of an example machine 1000 upon which any one or more of the techniques (e.g., methodologies) discussed herein may perform. In alternative embodiments, the machine 1000 may operate as a standalone device or may be connected (e.g., networked) to other machines. In a networked deployment, the machine 1000 may operate in the capacity of a server machine, a client machine, or both in server-client network environments. In an example, the machine 1000 may act as a peer machine in peer-to-peer (P2P) (or other distributed) network environment. The machine 1000 may be a personal computer (PC), a tablet PC, a set-top box (STB), a personal digital assistant (PDA), a mobile telephone, a web appliance, an IoT device, automotive system, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic, components, devices, packages, or mechanisms. Circuitry is a collection (e.g., set) of circuits implemented in tangible entities that include hardware (e.g., simple circuits, gates, logic, etc.). Circuitry membership may be flexible over time and underlying hardware variability. Circuitries include members that may, alone or in combination, perform specific tasks when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable participating hardware (e.g., the execution units or a loading mechanism) to create members of the circuitry in hardware via the variable connections to carry out portions of the specific tasks when in operation. Accordingly, the computer readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

The machine (e.g., computer system) 1000 (e.g., the host device 510, the memory device 520, etc.) may include a hardware processor 1002 (e.g., a CPU, a graphics processing unit (GPU), a hardware processor core, or any combination thereof, such as the memory controller 115, etc.), a main memory 1004 and a static memory 1006, some or all of which may communicate with each other via an interlink (e.g., bus) 1008. The machine 1000 may further include a display unit 1010, an alphanumeric input device 1012 (e.g., a keyboard), and a user interface (UI) navigation device 1014 (e.g., a mouse). In an example, the display unit 1010, input device 1012 and UI navigation device 1014 may be a touch screen display. The machine 1000 may additionally include a signal generation device 1018 (e.g., a speaker), a network interface device 1020, and one or more sensors 1016, such as a global positioning system (GPS) sensor, compass, accelerometer, or other sensor. The machine 1000 may include an output controller 1028, such as a serial (e.g., USB, parallel, or other wired or wireless (e.g., infrared (IR), near field communication (NFC), etc.) connection to communicate or control one or more peripheral devices (e.g., a printer, card reader, etc.).

The machine 1000 may include a machine readable medium 1022 on which is stored one or more sets of data structures or instructions 1024 (e.g., software) embodying or utilized by any one or more of the techniques or functions described herein. The instructions 1024 may also reside, completely or at least partially, within the main memory 1004, within static memory 1006, or within the hardware processor 1002 during execution thereof by the machine 1000. In an example, one or any combination of the hardware processor 1002, the main memory 1004, or the static memory 1006 may constitute the machine readable medium 1022.

While the machine readable medium 1022 is illustrated as a single medium, the term "machine readable medium" may include a single medium or multiple media (e.g., a centralized or distributed database, or associated caches and servers) configured to store the one or more instructions 1024.

The term "machine readable medium" may include any medium capable of storing or encoding instructions for execution by the machine 1000 and that cause the machine 1000 to perform any one or more of the techniques of the present disclosure, or capable of storing, encoding or carrying data structures used by or associated with such instructions. Non-limiting machine-readable medium examples include solid-state memories, and optical and magnetic media. In an example, a massed machine-readable medium comprises a machine-readable medium with multiple particles having invariant (e.g., resting) mass. Accordingly, massed machine-readable media are not transitory propagating signals. Specific examples of massed machine-readable media may include: non-volatile memory, such as semiconductor memory devices (e.g., Electrically Programmable Read-Only Memory (EPROM). Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1024 (e.g., software, programs, an operating system (OS), etc.) or other data are stored on the storage device 1021, may be accessed by the memory 1004 for use by the processor 1002. The memory 1004 (e.g., DRAM) is typically fast, but volatile, and thus a different type of storage than the storage device 1021 (e.g., an SSD), which is suitable for long-term storage, including while in an "off" condition. The instructions 1024 or data in use by a user or the machine 1000 are typically loaded in the memory 1004 for use by the processor 1002. When the memory 1004 is full, virtual space from the storage device 1021 may be allocated to supplement the memory 1004; however, because the storage 1021 device is typically slower than the memory 1004, and write speeds are typically at least twice as slow as read speeds use of virtual memory may greatly reduce user experience due to storage device latency (in contrast to the memory 1004. e.g., DRAM). Further, use of the storage device 1021 for virtual memory may greatly reduce the usable lifespan of the storage device 1021.

In contrast to virtual memory, virtual memory compression (e.g., the Linux® kernel feature "ZRAM") uses part of the memory as compressed block storage to avoid paging to the storage device 1021. Paging takes place in the compressed block until it is necessary to write such data to the storage device 1021. Virtual memory compression increases the usable size of memory 1004, while reducing wear on the storage device 1021.

Storage devices optimized for mobile electronic devices, or mobile storage, traditionally include MMC solid-state storage devices (e.g., micro Secure Digital (microSD™) cards, etc.). MMC devices include a number of parallel interfaces (e.g., an 8-bit parallel interface) with a host device and are often removable and separate components from the host device. In contrast, eMMC™ devices are attached to a circuit board and considered a component of the host device, with read speeds that rival serial ATA™ (Serial AT (Advanced Technology) Attachment, or SATA) based SSD devices. However, demand for mobile device performance continues to increase, such as to fully enable virtual or augmented-reality devices, utilize increasing networks speeds, and the like. In response to this demand, storage devices have shifted from parallel to serial communication interfaces. UFS devices, including controllers and firmware, communicate with a host device using a low-voltage differential signaling (LVDS) serial interface with dedicated read/write paths, further advancing greater read/write speeds.

The instructions 1024 may further be transmitted or received over a communications network 1026 using a transmission medium via the network interface device 1020 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 1020 may include one or more physical jacks (e.g., Ethernet, coaxial, or phone jacks) or one or more antennas to connect to the communications network 1026. In an example, the network interface device 1020 may include multiple antennas to wirelessly communicate using at least one of single-input multiple-output (SIMO), multiple-input multiple-output (MIMO), or multiple-input single-output (MISO) techniques.

The term "transmission medium" shall be taken to include any intangible medium capable of storing, encoding or carrying instructions for execution by the machine 1000, and includes digital or analog communications signals or other intangible medium to facilitate communication of such software.

To better illustrate the methods and apparatuses described herein, a non-limiting set of Example embodiments are set forth below as numerically identified Examples.

Example 1 is memory device comprising a memory array comprising at least SLC data blocks and MLC data blocks; a write buffer; and a memory controller configured to receive commands from a host device and to execute instructions that, when executed, implement operations including enabling the write buffer to receive host data from the host device; upon receipt of a command to synchronize a cache, determining whether the write buffer is full of host data above a predetermined threshold; when the write buffer is full of host data above the predetermined threshold, flushing host data in the write buffer to an open MLC data block; and when the write buffer is not full of host data above the predetermined threshold, flushing host data in the write buffer to a temporary storage location.

Example 2 includes the subject matter of Example 1 wherein the operations further comprise, after flushing the host data in the write buffer to the temporary storage location, maintaining the host data in the write buffer, enabling the write buffer to receive additional host data from the host device, and upon a determination that the write buffer has been filled by the additional host data, transferring the host data in the write buffer to an additional open MLC data block.

Example 3 includes the subject matter of Examples 1 and 2 wherein the wherein the operations further comprise determining whether host data in the write buffer has been lost and, upon determining whether host data in the write buffer has been lost, transferring host data stored in the temporary storage location back to the write buffer to reconstitute the write buffer.

Example 4 includes the subject matter of Examples 1-3 wherein the predetermined threshold is 80% of the available memory storage space of the write buffer.

Example 5 includes the subject matter of Examples 1-4 wherein flushing host data in the write buffer to the open MLC block comprises flushing one or more pages of data storage at a time from the write buffer in a one-pass transfer to the open MLC data block.

Example 6 includes the subject matter of Examples 1-5 wherein flushing the host data in the write buffer to the temporary storage location comprises flushing a single page of a single plane of data storage at a time from the write buffer to a temporary SLC data block.

Example 7 includes the subject matter of Examples 1-6 wherein flushing the host data in the write buffer to the temporary storage location comprises flushing a single page of a single plane of data storage 4 kB at a time in accordance with the number of pages of data that may be transferred at a time by a one-pass transfer program from the write buffer to a temporary SLC data block.

Example 8 is a method of managing a memory device comprising a memory array comprising at least single-level cell (SLC) data blocks and multiple-level cell (MLC) data blocks, a write buffer, and a memory controller configured to receive commands from a host device, the method including upon receipt of a command to synchronize a cache, determining whether the write buffer is full of host data above a predetermined threshold; when the write buffer is full of host data above the predetermined threshold, flushing host data in the write buffer to an open MLC data block; and when the write buffer is not full of host data above the predetermined threshold, flushing host data in the write buffer to a temporary storage location.

Example 9 includes the subject matter of Example 8 further comprising, after flushing the host data in the write buffer to the temporary storage location, maintaining the host data in the write buffer, enabling the write buffer to receive additional host data from the host device, and upon a determination that the write buffer has been filled by the additional host data, transferring the host data in the write buffer to an additional open MLC data block.

Example 10 includes the subject matter of Examples 8 and 9 further comprising determining whether host data in the write buffer has been lost and, upon determining whether host data in the write buffer has been lost, transferring host data stored in the temporary storage location back to the write buffer to reconstitute the write buffer.

Example 11 includes the subject matter of Examples 8-10 wherein the predetermined threshold is 80% of the available memory storage space of the write buffer.

Example 12 includes the subject matter of Examples 8-11 wherein flushing host data in the write buffer to the open MLC block comprises flushing one or more pages of data storage at a time from the write buffer in a one-pass transfer to the open MLC data block.

Example 13 includes the subject matter of Examples 8-12 wherein flushing the host data in the write buffer to the temporary storage location comprises flushing a single page of a single plane of data storage at a time from the write buffer to a temporary SIX data block.

Example 14 includes the subject matter of Examples 8-13 wherein flushing the host data in the write buffer to the temporary storage location comprises flushing a single page of a single plane of data storage 4 kB at a time in accordance with the number pages of data that may be transferred at a time by a one-pass transfer program from the write buffer to a temporary SLC data block.

Example 15 is at least one non-transitory device-readable storage medium comprising instructions that, when executed by a memory controller of a storage system comprising at least single-level cell (SLC) data blocks, multiple-level cell (MLC) data blocks, and a write buffer, cause the memory controller to perform operations comprising upon receipt of a command from a host device to synchronize a cache, determining whether the write buffer is full of host data above a predetermined threshold; when the write buffer is full of host data above the predetermined threshold, flushing host data in the write buffer to an open MLC data block; and when the write buffer is not full of host data above the predetermined threshold, flushing host data in the write buffer to a temporary storage location.

Example 16 includes the subject matter of Example 15 further comprising instructions that when executed by the memory controller cause the memory controller to perform operations including, after flushing the host data in the write buffer to the temporary storage location, maintaining the host data in the write buffer, enabling the write buffer to receive additional host data from the host device, and upon a determination that the write buffer has been filled by the additional host data, transferring the host data in the write buffer to an additional open MLC data block.

Example 17 includes the subject matter of Examples 15 and 16 further comprising instructions that when executed by the memory controller cause the memory controller to perform operations including determining whether host data in the write buffer has been lost and, upon determining whether host data in the write buffer has been lost, transferring host data stored in the temporary storage location back to the write buffer to reconstitute the write buffer.

Example 18 includes the subject matter of Examples 15-17 wherein instructions for flushing host data in the write buffer to the open MLC block further comprises instructions that when executed by the memory controller cause the memory controller to perform operations including flushing one or more pages of data storage at a time from the write buffer in a one-pass transfer to the open MLC data block.

Example 19 includes the subject matter of Examples 15-18 wherein instructions for flushing the host data in the write buffer to the temporary SLC data block comprises instructions that when executed by the memory controller cause the memory controller to perform operations including flushing a single page of a single plane of data storage at a time from the write buffer to a temporary SLC data block.

Example 20 includes the subject matter of Examples 15-19 wherein instructions for flushing the host data in the write buffer to the temporary SLC data block comprises instructions that when executed by the memory controller cause the memory controller to perform operations including flushing a single page of a single plane of data storage 4 kB at a time in accordance with the number of pages of data that may be transferred at a time by a one-pass transfer program from the write buffer to a temporary SLC data block.

In Example 21, any of the memory devices of Examples 1 to 7 may be adapted and operated to perform operations in accordance with any of the methods of Examples 8-14.

In Example 22, any of the methods of Examples 8 to 14 may be performed in response to execution of instructions of the non-transitory device-readable storage medium of Examples 15-20.

In Example 23, any of the memory devices of Examples 1 to 7 may include a non-transitory device-readable storage medium of Examples 15-20 that is configured to store instructions that may be executed to perform one or more operations of the memory devices.

In Example 24, any of the methods of Examples 8 to 14 may be performed using the memory devices of Examples 1-7.

In Example 25, any of the memory devices of Examples 1 to 7, may be incorporated into an electronic system further comprising a host processor and a communication bus extending between the host processor and the memory device.

In Example 26, any of the methods of Examples 8-14 may be performed by an electronic system including a host processor and a communications interface extending between the host processor and a memory device.

In Example 27, any of the device-readable storage media of Examples 15 to 20 may be adapted and operated to perform operations in accordance with any of the methods of Examples 8 to 14.

The above detailed description includes references to the accompanying drawings, which form a part of the detailed description. The drawings show, by way of illustration, specific embodiments in which the systems and methods described herein may be practiced. These embodiments are also referred to herein as "examples". Such examples may include elements in addition to those shown or described. However, the present inventor also contemplates examples in which only those elements shown or described are provided. Moreover, the present inventor also contemplates examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term, "or" is used to refer to a nonexclusive or, such that "A or B" may include "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, i.e., a system, device, article, or process that includes elements in addition to those listed after such a term in a claim are still deemed to fall within the scope of that claim. Moreover, in the following claims, the terms "first," "second," and "third," and the like are used merely as labels, and are not intended to impose numerical requirements on their objects.

In various examples, the components, controllers, processors, units, engines, or tables described herein may include, among other things, physical circuitry or firmware stored on a physical device. As used herein, "processor" means any type of computational circuit such as, but not limited to, a microprocessor, a microcontroller, a graphics processor, a digital signal processor (DSP), or any other type of processor or processing circuit, including a group of processors or multi-core devices.

Various embodiments according to the present disclosure and described herein include memory utilizing a vertical structure of memory cells (e.g., NAND strings of memory cells). As used herein, directional adjectives will be taken relative a surface of a substrate upon which the memory cells are formed (i.e., a vertical structure will be taken as extending away from the substrate surface, a bottom end of the vertical structure will be taken as the end nearest the substrate surface and a top end of the vertical structure will be taken as the end farthest from the substrate surface).

Operating a memory cell, as used herein, includes reading from, writing to, or erasing the memory cell. The operation of placing a memory cell in an intended state is referred to herein as "programming," and may include both writing to or erasing from the memory cell (e.g., the memory cell may be programmed to an erased state).

According to one or more embodiments of the present disclosure, a memory controller (e.g., a processor, controller, firmware, etc.) located internal or external to a memory device, is capable of determining (e.g., selecting, setting, adjusting, computing, changing, clearing, communicating, adapting, deriving, defining, utilizing, modifying, applying, etc.) a quantity of wear cycles, or a wear state (e.g., recording wear cycles, counting operations of the memory device as they occur, tracking the operations of the memory device it initiates, evaluating the memory device characteristics corresponding to a wear state, etc.)

According to one or more embodiments of the present disclosure, a memory access device may be configured to provide wear cycle information to the memory device with each memory operation. The memory device control circuitry (e.g., control logic) may be programmed to compensate for memory device performance changes corresponding to the wear cycle information. The memory device may receive the wear cycle information and determine one or more operating parameters (e.g., a value, characteristic) in response to the wear cycle information.

It will be understood that when an element is referred to as being "on," "connected to" or "coupled with" another element, it may be directly on, connected, or coupled with the other element or intervening elements may be present. In contrast, when an element is referred to as being "directly on," "directly connected to" or "directly coupled with" another element, there are no intervening elements or layers present. If two elements are shown in the drawings with a line connecting them, the two elements may be either be coupled, or directly coupled, unless otherwise indicated.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, the code may be tangibly stored on one or more volatile or non-volatile tangible computer-readable media, such as during execution or at other times. Examples of these tangible computer-readable media may include, but are not limited to, hard disks, removable magnetic disks, removable optical disks (e.g., compact discs and digital video disks), magnetic cassettes, memory cards or sticks, random access memories (RAMs), read only memories (ROMs), solid state drives (SSDs), UFS devices, eMMC devices, and the like.

The above description is intended to be illustrative, and not restrictive. For example, the above-described examples (or one or more aspects thereof) may be used in combination with each other. Other embodiments may be used, such as by one of ordinary skill in the art upon reviewing the above description. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments may be combined with each other in various combinations or permutations. The scope of the invention should be determined with reference to the appended claims, along with the full scope of equivalents to which such claims are entitled.

The invention claimed is:
1. A memory device comprising:
a memory array comprising at least single-level cell (SLC) data blocks and multiple-level cell (MLC) data blocks;
a write buffer; and
a memory controller configured to receive commands from a host device and to execute instructions retained within the memory device that, when executed, implement operations including:
enabling the write buffer to receive host data from the host device;

upon receipt of a command to flush the write buffer to the memory array, determining whether the write buffer is full of host data above a predetermined threshold;

when the write buffer is full of host data above the predetermined threshold, flushing host data in the write buffer to an open MLC data block;

when the write buffer is not full of host data above the predetermined threshold, flushing host data in the write buffer to a temporary storage location including SLC data blocks of the memory array and maintaining the host data in the write buffer;

determining whether host data in the write buffer has been lost and, upon determining that host data in the write buffer has been lost, transferring host data stored in the temporary storage location back to the write buffer to reconstitute the write buffer; and enabling the write buffer to receive additional host data from the host device, and upon a subsequent determination that the write buffer has been filled above the predetermined threshold by the additional host data, transferring the host data in the write buffer to an additional open MLC data block.

2. The memory device of claim 1, wherein the predetermined threshold is 80% of available memory storage space of the write buffer.

3. The memory device of claim 1, wherein flushing host data in the write buffer to the open MLC block comprises flushing one or more pages of data storage at a time from the write buffer in a one-pass transfer to the open MLC data block.

4. The memory device of claim 1, wherein flushing the host data in the write buffer to the temporary storage location comprises flushing a single page of a single plane of data storage at a time from the write buffer to the SLC data block.

5. The memory device of claim 1, wherein flushing the host data in the write buffer to the temporary storage location comprises flushing a single page of a single plane of data storage 4 KB at a time by a one-pass transfer program from the write buffer to a SLC data block.

6. A method of managing a memory device comprising a memory array comprising at least single-level cell (SLC) data blocks and multiple-level cell (MLC) data blocks, a write buffer, and a memory controller configured to receive commands from a host device, the method including:

upon receipt of a command to flush the write buffer to the memory array, determining whether the write buffer is full of host data above a predetermined threshold;

when the write buffer is full of host data above the predetermined threshold, flushing host data in the write buffer to an open MLC data block; and when the write buffer is not full of host data above the predetermined threshold, flushing host data in the write buffer to a temporary storage location in the memory array including SLC data blocks, and maintaining the host data in the write buffer;

determining whether host data in the write buffer has been lost and, upon determining that host data in the write buffer has been lost, transferring host data stored in the temporary storage location back to the write buffer to reconstitute the write buffer; and enabling the write buffer to receive additional host data from the host device, and upon a determination that the write buffer has been filled above the predetermined threshold by the additional host data, transferring the host data in the write buffer to an additional open MLC data block.

7. The method of claim 6, wherein the predetermined threshold is 80% of available memory storage space of the write buffer.

8. The method of claim 6, wherein flushing host data in the write buffer to the open MLC block comprises flushing one or more pages of data storage at a time from the write buffer in a one-pass transfer to the open MLC data block.

9. The method of claim 6, wherein flushing the host data in the write buffer to the temporary storage location comprises flushing a single page of a single plane of data storage at a time from the write buffer to a SLC data block.

10. The method of claim 6, wherein flushing the host data in the write buffer to the temporary storage location comprises flushing a single page of a single plane of data storage 4 KB at a time by a one-pass transfer program from the write buffer to a temporary SLC data block.

11. At least one non-transitory device-readable storage medium comprising instructions that, when executed by a memory controller of a storage system comprising at least single-level cell (SLC) NAND data blocks, multiple-level cell (MLC) NAND data blocks, and a write buffer, cause the memory controller to perform operations comprising:

upon receipt of a command from a host device to flush the write buffer to the memory array, determining whether the write buffer is full of host data above a predetermined threshold;

when the write buffer is full of host data above the predetermined threshold, flushing host data in the write buffer to an open MLC NAND data block; and when the write buffer is not full of host data above the predetermined threshold, flushing host data in the write buffer to a temporary storage location including SLC data blocks of the memory array, and maintaining the host data in the write buffer;

determining whether host data in the write buffer has been lost and, upon determining that host data in the write buffer has been lost, transferring host data stored in the temporary storage location back to the write buffer to reconstitute the write buffer; and receiving additional host data from the host device in the write buffer, and upon a determination that the write buffer has been filled to above the predetermined threshold by one or more writes of additional host data, transferring the host data in the write buffer to an additional open MLC data block.

12. The medium of claim 11 wherein flushing host data in the write buffer to the open MLC block further comprises flushing one or more pages of data storage at a time from the write buffer in a one-pass transfer to the open MLC data block.

13. The medium of claim 11, wherein the operation of flushing the host data in the write buffer to the temporary SLC NAND data block comprises flushing a single page of a single plane of data storage at a time from the write buffer to a temporary SLC data block.

14. The medium of claim 11, wherein the operation of flushing the host data in the write buffer to the temporary SLC data block comprises flushing a single page of a single plane of data storage 4 KB at a time by a one-pass transfer program from the write buffer to a temporary SLC data block.

* * * * *